(12) United States Patent
Sowell et al.

(10) Patent No.: US 8,732,213 B2
(45) Date of Patent: May 20, 2014

(54) SCALABLE ANALYSIS PLATFORM FOR SEMI-STRUCTURED DATA

(71) Applicant: Amiato, Inc., Saratoga, CA (US)

(72) Inventors: Benjamin A. Sowell, Mountain View, CA (US); Nathan A. Binkert, Redwood City, CA (US); Stavros Harizopoulos, San Francisco, CA (US); Mehul A. Shah, Saratoga, CA (US); Dimitrios Tsirogiannis, San Mateo, CA (US)

(73) Assignee: Amiato, Inc., Saratoga, CA (US)

( * ) Notice: Subject to any disclaimer, the term of this patent is extended or adjusted under 35 U.S.C. 154(b) by 0 days.

(21) Appl. No.: 13/725,399

(22) Filed: Dec. 21, 2012

(65) Prior Publication Data

US 2013/0166568 A1 Jun. 27, 2013

Related U.S. Application Data

(60) Provisional application No. 61/580,193, filed on Dec. 23, 2011.

(51) Int. Cl.
*G06F 17/30* (2006.01)

(52) U.S. Cl.
USPC .......................................................... 707/809

(58) Field of Classification Search
USPC .......................................................... 707/809
See application file for complete search history.

(56) References Cited

U.S. PATENT DOCUMENTS

| | | | |
|---|---|---|---|
| 6,826,568 B2 * | 11/2004 | Bernstein et al. | 707/749 |
| 7,096,224 B2 * | 8/2006 | Murthy et al. | 707/763 |
| 7,337,182 B2 * | 2/2008 | Rothschiller et al. | 707/808 |
| 7,444,330 B2 * | 10/2008 | Bernstein et al. | 707/999.101 |
| 2006/0167880 A1 * | 7/2006 | Meijer et al. | 707/9 |
| 2008/0275907 A1 * | 11/2008 | Han et al. | 707/102 |
| 2009/0024590 A1 | 1/2009 | Sturge et al. | |
| 2010/0293163 A1 * | 11/2010 | McLachlan et al. | 707/736 |
| 2011/0191361 A1 | 8/2011 | Gupta et al. | |
| 2013/0086104 A1 * | 4/2013 | Morrison et al. | 707/769 |

FOREIGN PATENT DOCUMENTS

| | | |
|---|---|---|
| KR | 10-0759186 B1 | 9/2007 |
| WO | WO-2005029313 A1 | 3/2005 |

OTHER PUBLICATIONS

Kevin Beyer et al., "System RX: One Part Relational, One Part XML", SIGMOD (2005), pp. 347-358.*
Cong Yu & H. V. Jagadish, "XML Schema Refinement Through Redundancy Detection and Normalization", VLDB Journal (2008), 17:203-223.*

(Continued)

*Primary Examiner* — Rehana Perveen
*Assistant Examiner* — Scott A Waldron
(74) *Attorney, Agent, or Firm* — Harness, Dickey & Pierce, P.L.C.; Michael P. Doerr; Michael R. Nye

(57) ABSTRACT

A method of operating a query system includes retrieving objects from a data source, wherein each of the retrieved objects includes (i) data and (ii) metadata describing the data. The method includes dynamically creating a cumulative schema by inferring a schema from each of the retrieved objects and merging the inferred schema with the cumulative schema. The method includes storing the data of each of the retrieved objects in a storage service. The method includes receiving, from a user, a query, and responding to the query based on data stored by the storage service.

50 Claims, 12 Drawing Sheets

(56) References Cited

OTHER PUBLICATIONS

David Lee, "JXON: An Architecture for Schema and Annotation Driven JSON/XML Bidirectional Transformations", Balisage: The Markup Conference Proceedings, Aug. 2-5, 2011, pp. 1-41.*

International Search Report and Written Opinion of the International Searching Authority regarding International Application No. PCT/US2012/071454, dated Apr. 16, 2013.

Beyer, Kevin S. et al., "Jaql: A Scripting Language for Large Scale Semistructured Data Analysis," in the 37th International Conference on Very Large Databases, Washington: VLDB Endowment, Sep. 2011, vol. 4, No. 12, pp. 1272-1283.

Hoff, Todd; LevelDB—Fast and Lightweight Key/Value Database from the Authors of MapReduce and BigTable; Aug. 10, 2011; 7 pages.

Goldman, Roy et al.; DataGuides: Enabling Query Formulation and Optimization in Semistructured Databases; 1997; 21 pages.

Zyp, K., Ed.; SitePen; A JSON Media Type for Describing the Structure and Meaning of JSON Documents; Nov. 22, 2010; 29 pages.

* cited by examiner

SCALABLE ANALYSIS PLATFORM FOR SEMI-STRUCTURED DATA

CROSS-REFERENCE TO RELATED APPLICATION

This application claims the benefit of U.S. Provisional Application No. 61/580,193, filed Dec. 23, 2011. The entire disclosure of the above application is incorporated herein by reference.

FIELD

The present disclosure relates to a scalable interactive database platform and more specifically to a scalable interactive database platform for semi-structured data that incorporates storage and computation.

BACKGROUND

The background description provided herein is for the purpose of generally presenting the context of the disclosure. Work of the presently named inventors, to the extent it is described in this background section, as well as aspects of the background description that may not otherwise qualify as prior art at the time of filing, are neither expressly nor impliedly admitted as prior art against the present disclosure.

Traditional database systems feature a query execution engine that is tightly integrated with the underlying storage back-end, which typically consists of block-addressable persistent storage devices with no compute capabilities. These devices (hard disk drives and/or solid state drives) are characterized by (a) access times that differ significantly depending on whether the data is accessed sequentially or randomly, (b) access units that have a fixed minimum size, set at the granularity of a block, and (c) significantly slower (orders of magnitude) access time than main memory. These characteristics, along with the assumption that the storage back-end does not have any non-trivial compute capabilities have had an important impact on the design of database systems, from storage management to query execution to query optimization.

Databases originally served as operational stores managing the day-to-day activities of businesses. As database technology improved both in performance and cost, businesses saw a need to keep an increasing amount of operational history and business state for later analysis. Such analyses help businesses gain insight into their processes and optimize them, thereby providing a competitive advantage and increasing profit.

Data warehousing arose out of this need. Business data is often well-structured, fitting easily into relational tables. Data warehouses are essentially scalable relational database systems offering a structured query language (SQL) for offline analysis of this business data, and optimized for read-mostly workloads. For example, data warehouses include traditional systems like Teradata and newer vendors such as Vertica, Greenplum, and Aster Data. They provide a SQL interface, indexes, and fast columnar access.

Typically, data warehouses are loaded periodically, e.g., nightly or weekly, with data ingested from various sources and operational systems. The process of cleaning, curating, and unifying this data into a single schema and loading it into a warehouse is known as extract-transform-load (ETL). As the variety of sources and data increases, the complexity of the ETL process also increases. Successfully implementing ETL, including defining appropriate schemas and matching input data to the predetermined schemas, can take professionals weeks to months, and changes can be hard or impossible to implement. There are a number of tools, such as Abinitio, Informatica, and Pentaho, in the market to assist with the ETL process. However, the ETL process generally remains cumbersome, brittle, and expensive.

The data analytics market has exploded with a number of business intelligence and visualization tools that make it easy for business users to perform ad hoc, iterative analyses of data in warehouses. Business intelligence tools build multidimensional aggregates of warehouse data and allow users to navigate through and view various slices and projections of this data. For example, a business user might want to see total monthly sales by product category, region, and store. Then, they might want to dig deeper to weekly sales for specific categories or roll-up to see sales for the entire country. Multidimensional aggregates may also be referred to as online analytical processing (OLAP) cubes. A number of business intelligence (BI) tools, such as Business Objects and Cognos, enable such analyses, and support a language called Multidimensional Expressions (MDX) for querying cubes. There are also a number of visualization tools, such as MicroStrategy, Tableau, and Spotfire, that allow business users to intuitively navigate these cubes and data warehouses.

More recently, the type of data that businesses want to analyze has changed. As traditional brick and mortar businesses go online and new online businesses form, these businesses need to analyze the types of data that leading companies, such as Google and Yahoo, are inundated with. These include data types such as web pages, logs of page views, click streams, RSS (Rich Site Summary) feeds, application logs, application server logs, system logs, transaction logs, sensor data, social network feeds, news feeds, and blog posts.

These semi-structured data do not fit well into traditional warehouses. They have some inherent structure, but the structure may be inconsistent. The structure can change quickly over time and may vary across different sources. They are not naturally tabular, and the analyses that users want to run over these data—clustering, classification, prediction, and so on—are not easily expressed with SQL. The existing tools for making effective use of these data are cumbersome and insufficient.

As a result, a new highly scalable storage and analysis platform arose, Hadoop, inspired by the technologies implemented at Google for managing web crawls and searches. At its core, Hadoop offers a clustered file system for reliably storing its data, HDFS (Hadoop Distributed File System), and a rudimentary parallel analysis engine, MapReduce, to support more complex analyses. Starting with these pieces, the Hadoop ecosystem has grown to include an indexed, operational store, HBase, and new query interfaces, Pig and Hive, that rely on MapReduce.

Hive is an Apache project that adds a query layer on top of Hadoop, without any of the optimizations found in traditional warehouses for query optimization, caching, and indexing. Instead, Hive simply turns queries in a SQL-like language (called Hive-QL) into MapReduce jobs to be run against the Hadoop cluster. There are three main problems with Hive for traditional business users. Hive does not support standard SQL, and does not have a dynamic schema. Further, Hive is not fast enough to allow interactive queries, since each Hive query requires a MapReduce job that re-parses all the source data, and often requires multiple passes through the source data.

Impala is a real-time engine for Hive-QL queries on Cloudera's Hadoop implementation. It provides analysis over Hive's sequence files and may eventually support nested models. However, it does not have a dynamic schema, instead requiring that a user still provide a schema up-front for the data to be queried.

Pig is another Apache project and offers a schema-free scripting language for processing log files in Hadoop. Pig, like Hive, translates everything into map-reduce jobs. Likewise, it doesn't leverage any indexes, and is not fast enough for interactivity.

Jaql is a schema-free declarative language (in contrast to declarative languages, like SQL) for analyzing JavaScript Object Notation (JSON) logs. Like Pig, it compiles into map-reduce programs on Hadoop, and shares many of the same drawbacks, including a non-interactive speed.

Hadoop itself is catching on fairly quickly, and is readily available in the cloud. Amazon offers elastic map-reduce, which may be effectively equivalent to Hadoop's MapReduce implementation running in the cloud. It works on data stored in Amazon's cloud-based S3 (Simple Storage Service) and outputs results to S3.

The advantages of the Hadoop ecosystem are three fold. First, the system scales to extreme sizes and can store any data type. Second, it is extremely low cost compared to traditional warehouses (as much as twenty times less expensive). Third, it is open-source, which avoids lock-in with a single vendor. Users want the ability to pick the right tool for the right job and avoid moving data between systems to get their job done. Although Hadoop is more flexible, using Hadoop requires specially skilled administrators and programmers with deep knowledge, who are usually hard to find. Moreover, Hadoop is too slow to be interactive. Even the simplest queries take minutes to hours to execute.

Dremmel is a tool developed internally at Google, which provides SQL-based analysis queries over nested-relational or semi-structured data. The original version handled data in ProtoBuf format. Dremmel requires users to define the schema upfront for all records. BigQuery is a cloud-based commercialization of Dremmel and is extended to handle CSV and JSON formats. Drill is an open-source version of Dremmel.

Asterix is a system for managing and analyzing semi-structured data using an abstract data model (ADM), which is a generalization of JSON, and annotation query language (AQL). Asterix does not support standard SQL, nor does it have fast access afforded by the present disclosure.

SUMMARY

A method of operating a query system includes retrieving objects from a data source, wherein each of the retrieved objects includes (i) data and (ii) metadata describing the data. The method includes dynamically creating a cumulative schema by inferring a schema from each of the retrieved objects and merging the inferred schema with the cumulative schema. The method includes storing the data of each of the retrieved objects in a storage service. The method includes receiving, from a user, a query, and responding to the query based on data stored by the storage service.

The method also includes converting the cumulative schema into a relational schema, and presenting the relational schema to the user, wherein the query from the user is constructed over the relational schema. The method also includes storing the data of each of the retrieved objects in at least one of (i) a first index and (ii) an array index, wherein the storage service includes the first index and the array index. The method also includes responding to the query based on data from at least one of the first index and the array index.

The method also includes storing a datum from a retrieved object in the first index as a key-value pair, wherein the value of the key-value pair is the datum, and wherein the key of the key-value pair is based on (i) a path of the datum consistent with the relational schema and (ii) a unique identifier of the retrieved object. The key of the key-value pair is constructed so that the first index collocates key-value pairs first by the path and then by the unique identifier. A datum that is part of an array is stored in the array index. Data that is part of an array is not stored in the first index.

The datum is stored in the array index as a key-value pair, wherein the value of the key-value pair is the datum, and wherein the key of the key-value pair is based on (i) a path of the datum consistent with the relational schema, (ii) a unique identifier of the retrieved object, and (iii) an index of the datum's location in the array. The key of the key-value pair is constructed so that the array index collocates key-value pairs first by the path, next by the unique identifier, and then by the index. The key of the key-value pair is further based on a join key. The key of the key-value pair is constructed so that the array index collocates key-value pairs first by the path, next by the unique identifier, next by the join key, and then by the index. The method also includes selectively storing the datum in an auxiliary array index.

The datum is stored in the auxiliary array index as a key-value pair, wherein the value of the key-value pair is the datum, and wherein the key of the key-value pair is based on (i) a path of the datum consistent with the relational schema, (ii) an index of the datum's location in the array, and (iii) a unique identifier of the object. The key of the key-value pair is constructed so that the auxiliary array index collocates key-value pairs first by the path, next by the index, and then by the unique identifier. The key of the key-value pair is further based on a join key. The key of the key-value pair is constructed so that the auxiliary array index collocates key-value pairs first by the path, next by the index, next by the unique identifier, and then by the join key.

The method also includes storing the first index in an order-preserving index store, wherein the storage service includes the order-preserving index store. The method also includes storing the array index in the order-preserving index store. The relational schema is a structured query language (SQL) schema, and the query is an SQL query. The query is one of a Hive-QL query, a jaql query, and XQuery.

The method also includes selectively identifying an object of the cumulative schema as a map. The object of the cumulative schema is identified as a map based on frequencies of occurrence of fields of the object within the retrieved objects. The method also includes tracking the occurrence frequencies while dynamically creating the cumulative schema. The object of the cumulative schema is identified as a map in response to an average of the frequencies of occurrence being below a threshold.

The method also includes storing a datum corresponding to the map into a map index as a key-value pair, wherein the value of the key-value pair is the datum, and wherein the key of the key-value pair is based on (i) a path of the datum consistent with the relational schema, (ii) a unique identifier of the retrieved object providing the datum, (iii) a join key of the map, and (iv) a map key of the datum in the map. The key of the key-value pair is constructed so that the map index collocates key-value pairs first by the path, next by the unique identifier, next by the join key, and then by the map key.

The method also includes storing a datum corresponding to the map into an auxiliary map index as a key-value pair, wherein the value of the key-value pair is the datum, and wherein the key of the key-value pair is based on (i) a path of the datum consistent with the relational schema, (ii) a map key of the datum in the map, (iii) a unique identifier of the retrieved object providing the datum, and (iv) a join key of the map. The key of the key-value pair is constructed so that the auxiliary map index collocates key-value pairs first by the path, next by the map key, next by the unique identifier, and then by the join key.

Converting the cumulative schema into the relational schema includes creating a root table with a column for each element in a top level of the cumulative schema. Converting the cumulative schema into the relational schema includes creating an additional table in the relational schema for each array in the cumulative schema. The additional table includes (i) a join key column, (ii) an index column, and (iii) for each scalar type of data in the array, a value column.

The method also includes inserting a join key column into the additional table and into the root table when the array is present at the top level of the cumulative schema. The method also includes inserting a join key column into the additional table and into an intermediate table when the array is nested in the cumulative schema below the top level. Converting the cumulative schema into the relational schema includes creating an additional table in the relational schema for each map in the cumulative schema.

The additional table includes (i) a join key column, (ii) a key column, and (iii) for each scalar type of data in the map, a value column. The key column is a string type. The method also includes inserting a join key column into the additional table and into the root table when the map is present at the top level of the cumulative schema.

The method also includes inserting a join key column into the additional table and into an intermediate table when the map is nested in the cumulative schema below the top level. The method also includes selectively storing a data value of a retrieved object in a value index as a key-value pair, wherein the key of the key-value pair is based on (i) a path of the data value consistent with the relational schema and (ii) the data value, wherein the value of the key-value pair is based on a unique identifier of the retrieved object, and wherein the storage service includes the value index.

The key of the key-value pair is constructed so that the value index collocates key-value pairs first by the path, and then by the data value. When the data value is part of an array, the value of the key-value pair is further based on an index of the data value in the array. The value of the key-value pair is further based on a join key of the array. When the data value is part of a map, the value of the key-value pair is further based on a map key of the data value in the map.

The value of the key-value pair is further based on a join key of the map. The method also includes generating the retrieved objects by adding metadata to raw data obtained from the data source. Inferring the schema for a retrieved object is performed based on the metadata of the retrieved object and inferred types of elements of the retrieved object. For each of the retrieved objects, the data of the retrieved object includes values and the metadata of the retrieved object includes names of the values.

Each of the retrieved objects is a JavaScript Object Notation (JSON) object. The cumulative schema is a JavaScript Object Notation (JSON) schema. The method also includes selectively storing each of the retrieved objects in a row index, wherein the storage service includes the row index. A retrieved object is stored in the row index as a key-value pair, wherein the key of the key-value pair is a unique identifier of the retrieved object, and wherein the value of the key-value pair is a serialization of the entire retrieved object.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Overview

Figure 1A:
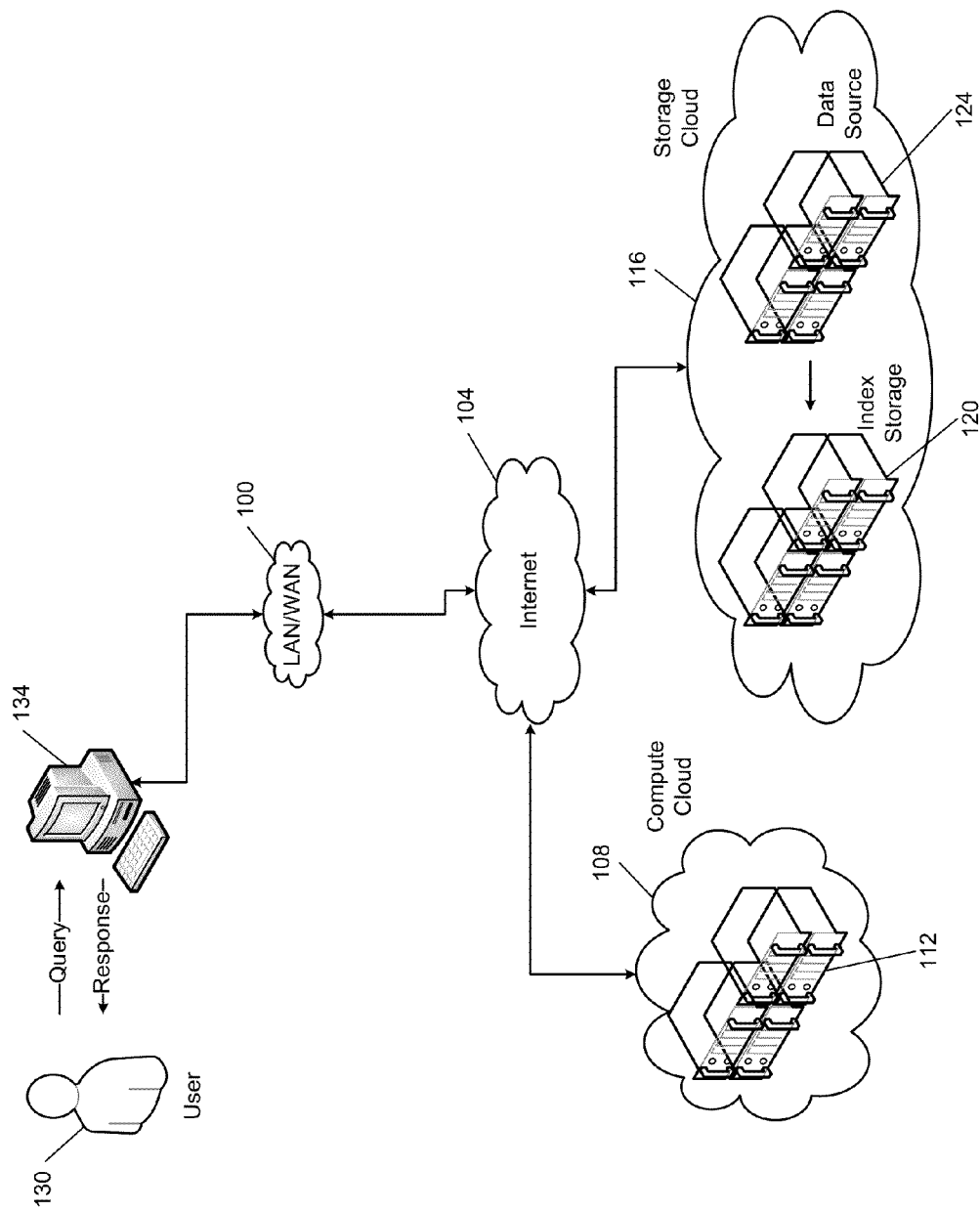
FIG. 1A depicts an example network architecture for a scalable analysis platform for semi-structured data that leverages cloud resources.

The present disclosure describes an analysis platform capable of offering a SQL (structured query language)-compliant interface for querying semi-structured data. For purposes of illustration only, semi-structured data is represented in JSON (JavaScript Object Notation) format. Other self-describing, semi-structured formats can be used according to the principles of the present disclosure. Source data does not need to be self-describing. The description can be separated from the data, as would be the case with something like protocol buffers. As long as there are rules, heuristics, or wrapper functions to apply tags to the data, any input data can be turned into objects similar to a JSON format.

In various implementations of the analysis platform according to the present disclosure, some or all of the following advantages are realized:

Speed

The analysis platform provides fast query response times to support ad-hoc, exploratory, and interactive analysis. Users can use this system to quickly discover hidden insights in the data, without having to submit a query and return later in the day or the next day to view the results. The analysis platform relies on an index store, storing all ingested data in indexes, which allows for fast response times.

Two primary indexes are used, a BigIndex (BI) and an ArrayIndex (AI), which are described in more detail below. These are a cross between path indexes and column-oriented stores. Like column-oriented stores, they allow queries to retrieve data only in the relevant fields, thereby reducing I/O (input/output) demands and improving performance. Unlike column stores, however, these indexes are suitable for complex nested objects and collections with numerous fields. For other access patterns, the analysis platform engine maintains auxiliary indexes, described in more detail below, including a ValueIndex (VI). Like traditional database indexes, the ValueIndex provides fast logarithmic access for specific field values or ranges of values. These indexes significantly reduce the data necessary to retrieve to satisfy a query, thereby improving response times.

Dynamic Schema

The analysis platform infers the schema from the data itself, so that users do not have to know an expected schema a priori, and predeclare the schema before data can be loaded. Semi-structured data may have varying structure, both over time and across different sources. So, the engine computes and updates the schema (or structure) from the data dynamically as data arrives. A relational schema based on this computed schema is presented to users, which they can use to compose queries.

Unlike previous analysis engines that require programmers to specify the schema of data collections before querying them, the present platform computes (or, infers) the underlying schema amongst all the ingested objects. Because of the dynamic schema property, there is a great deal of flexibility. Applications that generate source data can change the structure as the application evolves. Analysts can aggregate and query data from various periods without needing to specify how the schema varies from period to period. Moreover, there is no need to design and enforce a global schema, which can take months, and often requires excluding data that does not fit the schema.

Other analysis systems like MapReduce or Pig that are sometimes described as "schema-free" have two main drawbacks. First, they require users to know the schema in order to query the data, instead of automatically presenting an inferred schema to the user. Second, they parse and interpret objects and their structure on every query, while the analysis platform parses and indexes objects at load time. These indexes allow subsequent queries to run much faster, as mentioned above. Previous engines do not provide automatic inference of a precise and concise schema from the underlying data.

SQL

The analysis platform exposes a standard SQL query interface (for example, an interface compliant with ANSI SQL 2003) so that users can leverage existing SQL tools (e.g., reporting, visualization, and BI tools) and expertise. As a result, business users familiar with SQL or SQL tools can directly access and query semi-structured data without the need to load a data warehouse. Since traditional SQL-based tools do not handle JSON or other semi-structured data formats, the analysis platform presents a relational view of the computed schema of JSON objects. It presents a normalized view and incorporates optimizations to keep the view manageable in size. Although the relational views may present several tables in the schema, these tables are not necessarily materialized.

In order to better accommodate representing semi-structured data in tabular form, the analysis platform can automatically identify "map" objects. Maps are objects (or nested objects) in which both the field name and value can be searched and queried. For example, an object may contain dates as field names and statistics like page views for the values. In the relational view, maps are extracted into separate tables and the data is pivoted such that keys are in a key column and values are in a value column.

Scale and Elasticity

The analysis platform scales to handle large dataset sizes. The analysis platform can automatically and dynamically distribute internal data structures and processing across independent nodes.

The analysis platform is designed and built for virtualized "cloud" environments, including public clouds such as Amazon Web Services and private clouds, such as virtualized server environments administered by the user's organization or offered by third parties, such as Rackspace. Various components of Amazon Web Services, including S3 (Simple Storage Service), EC2 (Elastic Compute Cloud), and Elastic Block Storage (EBS), can be leveraged. The analysis platform is elastic, meaning it can scale up and down to arbitrary sizes on demand, and can hibernate by storing its internal data structures on long-term stores, such as Amazon S3. The analysis platform also has multi-tenancy and multi-user support.

The analysis platform uses a service-based architecture that has four components: the proxy, the metadata service, the query executor, and the storage service. To scale the analysis platform engine to support larger datasets, provide faster responses, and support more users, the execution engine is parallelized and the storage service is partitioned across independent, low-cost server nodes. These nodes can be real servers or virtualized servers in a hosted environment. Since the executor and storage service are de-coupled, they can be scaled independently. This de-coupled, scale-out architecture allows the user to leverage the on-demand elasticity for storage and computing that a cloud environment like AWS provides.

The storage service is configurable with various partitioning strategies. Moreover, the underlying data structures (indexes and metadata) can be migrated to long-term storage like Amazon S3, to hibernate the system when not in use, thereby decreasing costs.

Synchronization

The analysis platform can be configured to automatically synchronize its contents with, and thereby replicate, the source data from repositories like HDFS (Hadoop Distributed File System), Amazon S3 (Simple Storage Service), and noSQL stores, such as MongoDB. These sources can be continuously monitored for changes, additions, and updates, so that the analysis platform can ingest the changed data. This allows query results to be relatively up-to-date.

Schema Inference

The analysis platform takes the following actions in response to data appearing in a source: (1) infer unified semi-structured (such as JSON) schema from the data, (2) create a relational view for the schema, (3) populate physical indexes with data, and (4) execute queries that leverage the indexes. Parts or all of actions 1, 2, and 3 may be pipelined to allow only a single pass through the data from the data source.

The first action, schema inference, is described first.

Introduction to Semi-Structured Data

JSON is an increasingly popular self-describing, semi-structured data format, and is very commonly used for data exchange on the internet. Again, while JSON is described here for illustration, and to provide context for later examples using the JSON format, the present disclosure is not limited to JSON.

Briefly, a JSON object consists of string fields (or columns) and corresponding values of potentially different types: numbers, strings, arrays, objects, etc. JSON objects can be nested and the fields can be multivalued, e.g., arrays, nested arrays, etc. A specification can be found at: http://JSON.org. Additional details are can be found in "A JSON Media Type for Describing the Structure and Meaning of JSON Documents," IETF (Internet Engineering Task Force) draft-zyp-json-schema-03, Nov. 22, 2010, available at http://tools.ietf.org/html/draft-zyp-json-schema-03, the entire disclosure of which is hereby incorporated by reference. There are generalizations of JSON to include more types, e.g., BSON (Binary JSON). Moreover, other semi-structured formats like XML, Protobuf, Thrift, etc. can all be converted to JSON. When using XML, queries may conform to XQuery instead of SQL.

Below is an example JSON object:

```
{ "player": { "fname": "George", "lname": "Ruth",
    "nickname" : "Babe"}, "born": "February 6, 1985",
    "avg": 0.342, "HR": 714,
    "teams": [ { "name": "Boston Red Sox", "years": "1914-
    1919" },
    { "name": "New York Yankees", "years": "1920-1934" },
    { "name": "Boston Braves", "years": "1935" } ] }
```

The structure of semi-structured objects can vary from object to object. So, in the same baseball data, the following object may be found:

```
{ "player": { "fname": "Sandy", "lname": "Koufax"},
    "born": "December 30, 1935",
    "ERA": 2.76, "strikeouts": 2396,
    "teams": [ { "name": "Brooklyn / LA Dodgers", "years":
    "1955-1966" } ] }
```

A schema describes the possible structures and data types found in a data collection. This schema includes the names of the fields, the types for the corresponding values, and the nesting relationships. Thus, the schema for the above two objects would be:

```
{ "player": { "fname": string, "lname": string, "nickname":
    string }, "born": string, "avg": number, "HR": number,
    "ERA": number, "strikeouts": number,
    "teams": [ { "name": string, "years": string } ] }
```

Although the above is the notation used throughout the document for illustrating schemas, a more complete specification is JSON-schema, available at http://JSON-schema.org. For example, types in the JSON-schema are generally included in quotes, as in string or "int." For conciseness and readability in this disclosure, the quotes will be omitted.

Semi-structured objects can alternatively be viewed as trees with fields as nodes and leaves as atomic values. A path in the object or schema is a path in this tree, e.g., "player.fname", "teams[ ].name".

Iterative Schema Inference

Before a user can ask questions of a data set, they need to know the schema—i.e., what fields or dimensions are available for querying. In many cases, the analyst is not responsible for generating the data, so they are unaware of what has been recorded and available. For example, in the baseball example above, an analyst may not know that the "ERA" field was available if only hitters had been observed in the collection. So, the analysis platform computes (or, infers) a unified schema from the ingested data and presents a relational view of the schema to assist the analyst in formulating queries.

The analysis platform aims to produce a schema aimed at optimizing the precision and conciseness of the schema. Generally, precise means that the schema represents all the structures in the observed or ingested data and does not allow for structures not yet seen. Concise means that the schema is small enough that it can be read and interpreted by a human.

The general approach to dynamically creating the schema is to start with a "current" schema inferred from past objects and grow the schema as new objects are ingested. We simply merge the current schema (S_curr) with the schema (type) of a new object (O_new) to arrive at the new schema (S_new):
S_new=merge(S_curr, type(O_new))

Roughly speaking, the merging process takes the union of the two schemas, collapsing common fields, sub-objects, and arrays, and adding new ones when they appear. This is discussed in more detail below.

Objects

Some of the following examples use data that resembles the output of a data stream from Twitter, referred to as the firehose. The Twitter firehose gives a stream (unending sequence) of JSON objects that represent the tweets "tweeted" and metadata about those tweets: e.g., user, location, topics, etc.). These tweets are analogous to many other types of event log data, such as that generated by modern web frameworks (e.g., Ruby on Rails), mobile applications, sensors and devices (energy meters, thermostats), etc. Although similar to Twitter data, the following examples diverge from actual Twitter data for purposes of explanation.

Basic JSON objects are straightforward to deal with; we simply infer the types seen in the object. For instance, consider the following object:

```
{ "created at": "Thu Nov 08", "id": 266353834,
    "source": "Twitter for iPhone",
    "text": "@ilstavrachi: would love dinner. Cook this:
        http://bit.ly/955Ffo",
    "user": {"id": 29471497, "screen_name": "Mashah08" },
    "favorited": false}
```

The schema inferred from that object would be:

```
{ "created_at": string, "id": number, "source": string,
    "text": string,
    "user": { "id": number, "screen_name": string },
    "favorited": boolean }
```

As new objects arrive, new fields can be added by performing a union on the set of fields. Sometimes, a field will be repeated, but its type varies, a condition called type polymorphism. The schema uses multiple attributes with the same key to represent type polymorphism.

Log formats often change and developers may add new fields, or change the field type. As a concrete example, consider the "id" field identifying the tweet, which was originally a number. However, as the number of tweets grew, certain programming languages could not handle such large numbers, and so the "id" field has been changed to a string. So, suppose we saw a new record of the form

```
{ "created_at": "Thu Nov 10", "id": "266353840",
    "source": "Twitter for iPhone",
    "text": "@binkert: come with me to @ilstavrachi place",
    "user": { "id": 29471497, "screen_name": "Mashah08" },
    "retweet_count": 0 }
```

Since a string "id" has now been seen, and a new field "retweet_count" has appeared, the schema is augmented as follows:

```
{ "created_at": string, "id": number, "id": string,
    "source": string, "text": string,
    "user": {"id": number, "screen_name": string },
    "retweet_count": number }
```

Notice that "id" appears twice, once as a string and once as a number. Sometimes, the structure of nested objects vary. For example, suppose we added more profile information for the user:

```
{ "created_at": "Thu Nov 10", "id": "266353875",
    "source": "Twitter for iPhone",
    "text": "@binkert: come with me to @ilstavrachi place",
    "user": { "id": "29471755", "screen_name": "mashah08",
    "location": "Saratoga, CA", "followers_count": 22 },
    "retweet_count": 0 }
```

In that case, the platform recursively merges the "user" nested schema to get the following schema:

```
{ "created_at": string, "id": number, "id": string,
    "source": string, "text": string,
    "user": {"id": number, "id": string, "screen_name": string,
    "location": string, "followers_count": number },
    "retweet_count": number }
```

Null Fields and Empty Objects

Empty objects or null fields can be present in JSON records. For example, the record for a person's coordinates (latitude and longitude) might be:
{"coordinates": { }}
The schema has the identical type:
{"coordinates": { }}
Strictly speaking, { } is termed instance, and the type is object. The examples and explanations in this disclosure vary from strict JSON for ease of explanation.
Similarly, the following object
{"geo": null}
has the identical type:
{"geo": null}
If a subsequent record has a value for the object, the empty object is filled in by applying the merge. For instance, the records:

```
{ "coordinates": { }}
{ "coordinates": {"type": "Point"} }
``` will produce the schema
{"coordinates": {"type": string}}
A null type is similarly replaced by an observed type. For example, the records

```
{ "geo": null }
{ "geo": true }
``` will produce the schema:
{"geo": boolean}
Arrays

Tweets often contain items such as hashtags (highlighted topic words), urls, and mentions of other Twitter users. The Twitter firehose, for example, may parse and extract these items automatically for inclusion in the tweet's JSON object. In the following examples, hashtag metadata is used to illustrate how the schema for arrays is inferred.

First, let's consider extracting and recording a list of starting offsets for hashtags in the following tweet (or string):
"#donuts #muffins #biscuits"
Those offsets may be represented with an array as follows:
{"offsets": [0, 8, 17] }
An array in the source data is represented in the schema as an array containing the types of the elements found in the source array, in no particular order. Thus, the schema for the above object is:
{"offsets": [number] }
One may want to include the hashtag along with the offset for later processing. In that case, the tweet object may enumerate both the hashtag and offset in the array as follows:
{"tags": [0, "donuts", 8, "muffins", 17, "biscuits"] }
The corresponding schema would include both types in the array:
{"tags": [number, string] }
Alternatively, the tags and offsets could be reversed as follows:
{"tags": ["donuts", 0, "muffins", 8, "biscuits", 17] }
and, because the "tags" array can contain either a string or number, the resulting schema is:
{"tags": [string, number] }
In fact, tag text and tag offsets can be included in adjacent objects:

```
{ "tags": ["donuts", "muffins", "biscuits"] },
{ "tags": [0, 8, 17] }
```

There are now two schemas for "tags":
{"tags": [string]} and {"tags": [number] }
In this case, the arrays are at the same depth and can be merged to yield the same schema as above:
{"tags": [string, number] }
Also, note that the following schemas are identical:

```
{ "tags": [string, number] }
{ "tags": [number, string] }
```

This is because the list of types is treated as a set. Types for array elements are merged where possible, and merging is further performed for objects and arrays inside arrays. In various other implementations, the order of types and dependencies among types (in both arrays and objects) could be preserved. However, this may make the schema much less concise.

Nested Objects

To illustrate nested objects, suppose both beginning and ending offsets are recorded as follows:

{ "tags": [{ "text": "donuts", "begin": 0 }, { "text": "donuts", "end": 6 }]}

The resulting schema is:

{ "tags": [{"text": string, "begin": number, "end": number }] }

As shown, the objects types are merged instead of typing the array elements separately.

Similarly, in a case where the tag string and offsets are in nested arrays:

{ "tags": [ [ "donuts", "muffins" ], [0 , 8] ] } ==>
{ "tags": [ [string], [number] ] }, The schema further reduces to:
{"tags": [[string, number]]}
This is the tradeoff made in various implementations of the present disclosure between precision of the schema and conciseness of the schema.

Empty objects and empty arrays are treated as follows. Because empty objects are filled in as described above, the following example schema reduction is possible:

{ "parsed": { "tag": {}, "tag": { "offset": number } } }
=> { "parsed": { "tag": { "offset": number }}

Similarly, using the merging rules for arrays, the following schema reductions are made:

{ "tags": [[], [ number ]] } => { "tags" : [[ number ]] }
{ "tags": [[], [[]]] } => { "tags": [[[]]] }
{ "tags": [[], [[]], [number]] } => { "tags": [[[]], [number]] } => { "tags": [[[], number]]] }

Merge Procedure

To create a new schema from a previous schema and a new object, the analysis platform first types (i.e., computes the schema for) the new object. This procedure is intended to specify the canonical semantics for typing, not describe any particular implementation. In the following description, the variables v, w, v_i, w_j range over any valid JSON value, while j, k, j_m, k_n range over valid strings. The base rules for typing are:

type(scalar v) = scalar_type of v
type({ k_1: v_1, . . . , k_n: v_n }) =
  collapse ({ k_1: type(v_1), . . . , k_n: type(v_n) })

type([ v_1, . . . , v_n ]) =
  collapse([ type(v_1), . . . , type(v_n) ])

The first rule simply states that for a scalar, such as 3 or "a", the corresponding type is inferred directly from the value itself (number for 3 or string for "a"). The second and third rules recursively type objects and arrays using the collapse function.

The collapse function repeatedly merges types of the same field in objects, and merges objects, arrays, and common types inside arrays. It continues recursively until the scalar types are reached. For objects, the collapse function is:

collapse ({ k_1: v_1, . . . , k_n: v_n }):
  while k_i == k_j:
    if v_i, v_j are scalar types and v_i == v_j OR
      v_i, v_j are objects OR v_i, v_j are arrays:
      replace {. . . , k_i: v_i, ..., k_j: v_j, . . . }
      with {. . . , k_i: merge(v_i, v_j), . . . }

For arrays, the collapse function is:

collapse([ v_1, . . . , v_n ]):
  while v_i, v_j are scalar types and v_i == v_j OR
    v_i, v_j are objects OR v_i, v_j are arrays:
    replace [ . . . , v_i, . . . , v_j, . . . ]
    with [. . . , merge(v_i, v_j), . . . ]

The merge function describes how to pairwise combine values to remove duplicates and combine arrays/maps. For objects, merge simply calls collapse recursively to collapse common fields:

merge(v, v) = v
merge({}, { k_1: v_1, . . . , k_n: v_n }) = { k_1: v_1, . . . , k_n: v_n }
merge({ j_1: v_1, . . . , j_n: v_n }, { k_1: w_1, . . . , k_m: w_m })
  = collapse({ j_1: v_1, . . . , j_n: v_n, k_1: w_1, . . . , k_m: w_m })

Similarly for arrays:

merge([], [v_1, . . . , v_n]) = [v_1, . . . , v_n]
merge([v_1, . . . , v_n], [w_1, . . . , w_m])
  = collapse([v_1, . . . , v_n, w_1, . . . ,w_m])

Nulls are preserved, such as shown here:

merge ( { "coordinates": {} } , { "coordinates": null } ,
  { "coordinates": [] } )
= { "coordinates": {} , "coordinates": [], "coordinates": null }

A JSON null is a value, just as the number 9 is a value. In a relation, NULL indicates that there was no value specified. In SQL, nulls are presented as tags<null>:boolean, where the Boolean value is True if the null exists, and NULL otherwise. To simplify the schema for a SQL user, the coordinates<null> column can be omitted if the user does not need to differentiate JSON nulls from SQL nulls.

Cumulative Example

With the above simple rules, it is possible to type deeply nested JSON records. For instance, consider a complex hypothetical record that represents page view statistics for a web page:

```
{ "stat": [ 10, "total_pageviews", { "counts": [1, [3]],
    "page_attr": 7.0 }, { "page_attr": ["internal"]} ]}
```

The following schema would be produced:

```
{ "stat": [number,
    string,
    { "counts": [number, [number]],
       "page_attr": number,
       "page_attr": [string]
    }]}
```

In various implementations, the JSON Schema format can be used to encode the inferred schema. This format is standardized, and can easily be extended to incorporate additional metadata (e.g., whether an object is a map). However, it is quite verbose and space-inefficient, so it is not used for the examples in this disclosure. For instance, in JSON-Schema format, the above schema is represented as follows:

```
{
  "type": "object",
  "properties": {
    "stat": {
      "items": {
        "type": [
          "number",
          "string",
          {
            "type": "object",
            "properties": {
              "counts": {
                "items": {
                  "type": [
                    "number",
                    {
                      "items": {
                        "type": "number"
                      },
                      "type": "array"
                    }
                  ]
                },
                "type": "array"
              },
              "page_attr": {
                "type": [
                  "number",
                  {
                    "items": {
                      "type": "string"
                    },
                    "type": "array"
                  }
                ]
              }
            }
          }
        ]
      }
```

```
      },
      "type": "array"
    }
  }
}
```

Map Adornment

Developers and analysts can use JSON objects and arrays for many different purposes. In particular, JSON objects are frequently used both as objects and as "maps." For example, a developer might create an object, where the fields are dates and values are collected statistics like page views. Another example is when fields are user ids and values are profiles. In these cases, the object is more like a map data structure rather than a static object. A user does not always know the possible fields names because there are so many of them, and the field names are dynamically created. As a result, users may want to query fields in the same way they query values.

To support this use, the analysis platform is able to identify maps. The analysis platform incorporates heuristics to identify maps, and also allows users to specify which nested objects should and should not be treated as maps. Tagging objects as maps is called adornment.

Generally, adornment is performed after the initial load—that is, it is not necessary to identify maps on the initial ingest. Adornment can be performed later on a second pass, or after more data has been ingested. In addition, maps can be reverted back to simply objects, if needed.

By default, JSON objects are treated as objects (or, structs, in C nomenclature). This can be explicitly indicated in the JSON Schema by annotating an object with "obj_type": object. The shorthand notation used in examples below is O{ }.

To flag maps, the heuristic looks for fields that as a group occur relatively infrequently compared to their containing object (container). For maps, the shorthand M{ } is used.

While computing the schema on the first pass, the frequency that fields occur is tracked. Consider an object (or nested-object) which occurs with frequency F in the data set. Let $v\_i$ be the frequency of field i in the object, and N be the number of unique fields of the object (irrespective of its type). The ratio $(sum(v\_i)/N)/F$ is the ratio of the average field frequency to the frequency of the container. If this ratio is below a threshold, such as 0.01, which may be user-configurable, then the containing object is designated as a map. In various implementations, empty objects in the JSON Schema are treated as maps.

Creating Relational Schema

After the schema of the JSON objects in the source data set is inferred, the analysis platform produces a relational schema that can be exposed to SQL users and SQL-based tools. The goal is to create a concise schema that represents the containment relationships in the JSON schema, while giving the users the power of standard SQL. This relational schema is produced from the adorned JSON schema, and is a view over the underlying semi-structured data set. A few examples of how a JSON schema is converted to a relational view are presented here, before discussing a generalized procedure for performing the conversion.

Objects

The simplest example is an object with simple scalar types, such as the following schema:

---
{ "created_at": string, "id": number, "text": string, "source": string, "favorited": boolean }
---

In this case, the fields of the object translate directly into columns of a relation:

---
Root(created_at: str, id: num, text: str, source: str, favorited: bool)
---

The relation (or, table) of the top-level object is called "Root" here, although it can be replaced by, for example, the name of the source collection, if such a name exists. In the interest of space and readability, the type names string, number, and boolean have been shortened to str, num, and bool.

The type can be added to the attribute name in order to support type polymorphism. For instance, consider the following schema:

---
{ "created_at": string, "id": number, "id": string, "text": string, "source": string, "favorited": boolean }
---

The resulting relational schema would then have separate "id" and "id" columns:

---
Root(created_at: str, id<num>: num, id<str>: str, source: str, text: str, favorited: bool)
---

Nested Objects

Nested objects produce new relations with foreign-key relationships. For instance, consider the JSON schema:

---
{ "created_at": string, "id": number, "source": string, "text": string, "user": { "id": number, "screen_name": string }, "favorited": boolean }
---

The corresponding relational schema is

---
Root(created_at: str, id: num, source: str, text: str, favorited: bool, user: join_key)
Root.user(id_jk: join_key, id: num, screen_name: str)
---

The nested object is "normalized" into a separate relation named by its path, "Root.user" in this case. The column "Root.user"."id_jk" in the new table that represents the sub-object is a foreign-key for the column "Root.user" ("user" column in the table "Root"). The type is specified as "join-key" to distinguish it from other columns, but in actual implementations, the join_key type is typically an integer.

Objects can be nested several levels deep. For example, retweet objects may include a retweeted status object, which includes the profile of the user that retweeted, resulting in the following schema:

---
{ "created_at": string, "id": number, "source": string, "text": string, "user": { "id": number, "screen_name": string }, "retweeted_status": { "created_at": string, "id": number, "user": { "id": number, "screen_name": string } }, "favorited": bolean }
---

The corresponding relational view is:

---
Root(created_at: str, id: num, source: str,
    text: str, favorited: bool,
    user: join_key, retweeted_status: join_key)
Root.user(id_jk: join_key, id: num, screen_name: str)
Root.retweeted_status(id_jk: join_key, created_at: str, id: num, user: join_key)
Root.retweeted_status.user(id_jk: join_key, id: num, screen_name: str)
---

Note that "Root.user", "Root.retweeted_status", and "Rootretweeted_status.user" are all separated into different tables.

Optimizing 1-to-1 Relationships

In nested object relationships, often there is a 1-to-1 relationship from rows in the main table to the rows in the table for the nested object. As a result, these can be collapsed 1-to-1 into a single table using dotted notation for the column names.

For example, the multi-relation examples above flatten into:

---
Root(created_at: str, id: num, source: str,
    text: str, favorited: bool,
    user.id: num, user.screen_name: str)
--- and, for the three-level nested object example,

---
Root(created_at: str, id: num, source: str,
    text: str, favorited: bool,
    user.id: num, user.screen_name: str,
    retweeted_status.created_at: str,
    retweeted_status.id: num,
    retweeted_status.user.id: num,
    retweeted_status.user.screen_name: str)
---

Note that, since the relational schema is simply a view over the JSON schema, flattened, partially flattened, or separate (un-flattened) relational schema can be presented to the user as desired by the analysis platform without modifying the underlying data. The only limitation is that the user not be presented with conflicting table definitions.

Maps

Without designating a set of fields as a map, the corresponding relational schema may include a huge number of columns. In addition, the user may want to query the field names; for example, they may want to find the average page views in December.

To solve these issues, the tables for (nested) objects that are adorned as maps can be "pivoted." For example, consider the following schema for keeping track of various metrics (daily page views, clicks, time spent, etc.) for each page on a web site:

```
O{ "page_url": string, "page_id": number,
   "stat_name": string,
   "metric": M{ "2012-01-01": number, "2012-01-02": number,
       ..., "2012-12-01": number, ... }}
```

Rather than producing a table with a separate column for each day, the fields and values can be stored as key-value pairs in a relation:

```
Root(page_url: str, page_id: num, stat_name: str,
     metric<map>: join_key)
Root.metric<map>(id_jk: join_key, key: string, val: num)
```

In this case, the id column is a foreign key; indicating within which record each map entry was originally present. For a year's worth of page views, instead of having 365 columns in table "Root.metric", there are only two. The "key" column stores the field names and the "val" column stores the values. For example, for the above schema, the database may contain these records for "www.noudata.com/jobs" (page_id 284):

```
Root("www.noudata.com/jobs", 284, "page_views", 3),
Root.metric<map>(3, "2012-12-01", 50),
Root.metric<map>(3, "2012-12-02", 30), ...
```

Pivoting still works when there is type polymorphism in the map. For example, suppose the metric represents sentiment, which contains both a category and a score indicating the strength of the category:

```
{ "page_url": "www.noudata.com/blog", "page_id": 285,
  "stat_name": "sentiment"
  "metric": { "2012-12-01": "agreement", "2012-12-01": 5,
              "2012-12-05": "anger", "2012-12-05": 2, ...
}}
```

The JSON schema would be:

```
O{ "page_url": string, "page_id": number,
   "stat_name": string,
   "metric": M{ "2012-12-01": string, "2012-12-01": number,
       ...,
       "2012-12-05": string, "2012-12-05": number,
       ...}}
```

When creating the relational schema, a new "val" column can be added to the map relation to include the new type. The other "val" columns can be appended with their types as well to distinguish the column names, as shown:

```
Root(page_url: str, page_id: num, stat_name: str,
     metric<map>: join_key)
Root.metric<map>(id_jk: join_key, key: string,
     val<str>: str, val<num>: num)
```

The entries resulting from the above JSON object would appear as:

```
Root.metric<map> (4, "2012-12-01", "agreement", NULL),
Root.metric<map> (4, "2012-12-01", NULL, 5),
Root.metric<map> (4, "2012-12-05", "anger", NULL),
Root.metric<map> (4, "2012-12-05", NULL, 2) ...
```

Once these maps are pivoted, users can apply predicates and functions to the key column as they would any other column.

Nested Maps

The basic principles are the same for nested maps. Consider a list of statistics per day and per hour:

```
M{"2012-12-01": M{ "12:00": number,
                   "01:00": number,
                   "02:00": number,
                   ...},
  "2012-12-02": M{ ... },
  ...}
```

The resulting schema would be

```
Root(id_jk: join_key, key: string, val<map>: join_key)
Root.val<map>(id_jk: join_key, key: string, val<num>: num)
```

Objects can also be nested inside maps:

```
M{"2012-12-01": O{ "sentiment": string,
                   "strength": number }
  "2012-12-02": O{ ... }
  ...}
```

The resulting flattened relational schema is:

```
Root(id_jk: join_key, key: string, val<map>: join_key)
Root.val<map>(id_jk: join_key, sentiment: string,
     strength: number)
```

Empty Elements

Empty objects sometimes appear in the data. Consider the schema:

```
{ "created_at": string, "id": number, "source": string,
  "text": string,
  "user": { "id": number, "screen_name": string } }
```

A JSON object may be received without user information, as shown here:

```
{ "created_at": "Thu Nov 08",
  "id": 266353834,
  "source": "Twitter for iPhone",
  "text": "@ilstavrachi: would love dinner. Cook this:
```

-continued

```
http://bit.ly/955Ffo",
"user": { } }
```

The empty user object can be represented with the following relational tuples:

```
Root("Thu Nov 08", 266353834, "Twitter for iPhone",
    "@ilstavrachi: would love dinner. Cook this:
    http://bit.ly/955Ffo", join_key)
Root.user(join_key, NULL, NULL)
```

If all ingested user objects had an empty object in the ingested stream, the resulting JSON schema would include an empty object. For example, see the final field ("user") in this schema:
{"id": number, "user": { }}
In this case, empty object "user" can be treated as a map, resulting in the following relational schema:

```
Root(id: num, user<map>: join_key)
Root.user<map>(id_jk: join_key, key: string)
```

Note that Root.user<map> does not have any value columns, and initially is empty. However, this design makes it straightforward to add columns later if the schema changes as new objects are ingested, because each record in Root will have already been assigned a join key.

Arrays

Arrays are treated similarly to maps, so the schema translation is quite similar. The major difference is that the string "key" field of a map is replaced by an "index" field of type integer (int) corresponding to the array index. A simple example is:
{"tags": [string] }
which leads to the relational schema:

```
Root(tags<arr>: join_key)
Root.tags<arr>(id_jk: join_key, index: int, val<str>: str)
```

Type polymorphism and nested arrays work the same way as for maps. Consider the following schema:
{"tags": [number, string] }
which leads to the relational schema:

```
Root(tags<arr>: join_key)
Root.tags<arr>(id_jk: join_key, index: int,
    val<num>: num, val<str>: str)
```

An object may be nested within in an array, as here:
{"tags": [{"text": string, "offset": number}] }
The resulting relational schema can be created as:

```
Root(tags<arr>: join_key)
Root.tags<arr>(id_jk: join_key, index: int, val: join_key)
Root.tags<arr>.val(id_jk: join_key, text: str, offset: num)
```

Using the 1-to-1 flattening optimization, the relational schema becomes:

```
Root(tags<arr>: join_key)
Root.tags<arr>(id_jk: join_key, index: int,
    val.text: str, val.offset: num)
```

Nested and Empty Arrays

Relational schemas can be created for nested and empty arrays in a similar manner to maps. For the following schema:
{"tags": [string, [number]], "urls": [ ]}
the relational schema would be:

```
Root(tags<arr>: join_key, urls<arr>: join_key)
Root.tags<arr>(id_jk: join_key, index: int,
    val<str>: str, val<arr>: join_key)
Root.tags<arr>.val<arr>(id_jk: join_key, index: int,
    val<num>: num)
Root.urls<arr>(id_jk: join_key, index: int)
```

Note that, for the nested array, a separate table is created with "val" appended to the table name. For the empty array, a separate table is created with only an "index" column, but no "val" column, which can be added later once the contents of the array are observed and typed.

Type Inference on Atomic Values

The above type inference and conversion to relational schema procedure relies on the basic types available in JSON. The same procedure applies equally to whatever type system is selected. In other words, the analysis platform can infer narrower scalar types like integer, float, and time, as long as the atomic scalar types can be inferred from the value. BSON and XML have such extended type systems. Moreover, various heuristics (such as regular expressions) can be used to detect more complex types such as dates and times.

Since ANSI SQL does not support the same types as JSON, the inferred types are converted into the most specific types seen thus far for the relational view. For example, if only integers have been seen for field "freq", then the number type will be converted to integer in the relational schema for "freq". Similarly, if both integers and floats have been observed, then the relational schema will show the "freq" column as a float. Likewise, string fields convert to character varying types in the relational schema. In other words, the more specific types than basic JSON types may be tracked.

An alternative is to rely on type polymorphism and use the more specific type system to infer the data value's types. That is, instead of using JSON primitive types, use ANSI SQL's primitive types.

Below are the list of types tracked during ingestion (on the left) and how they are converted for the SQL schema (on the right). Most SQL databases support additional types including text which can be used if desired by the client. Note: the ObjectId type is specific to BSON.

```
int32, --> INTEGER
int64, --> INTEGER
double, --> DOUBLE PRECISION
string, --> VARCHAR
date, --> DATE
bool, --> BOOLEAN
object_id, (BSON) --> VARCHAR (24)
```

-continued

```
    time --> TIME
    timestamp --> TIMESTAMP
```

Procedure

Converting from a JSON schema to a relational schema can be accomplished using a recursive unpacking of the nested JSON schema structure. A pseudocode representation of an example implementation is shown here.

```
Call for every attribute in topmost object:
attr_schema, "Root", attr_name
create_schema(json_schema, rel_name, attr_name):
/* Creates a table (relation) if it's adorned as an object
*/
if json_schema is object:
    Add join key called attr_name to relation rel_name
    new_rel = rel_name + "." + attr_name
    Create relation new_rel
    add (id_jk: join_key) to new_rel
    /* recursively add attributes to the table (relation) */
    for attr, attr_schema in json_schema:
        create_schema(attr_schema, new_rel, attr)
/* Creates appropriate attrs and table for (nested) map */
else if json_schema is map:
    Add join key called 'attr_name + <map>' to relation
    rel_name
    new_rel = rel_name + "." + attr_name<map>
    Create relation new_rel
    Add (id_jk: join_key) and (key: string) to new_rel
    /* recursively add attributes to the table (relation) */
    for each distinct value type val_type in json_schema:
        create-schema(val_type, new_rel, "val")
/* Creates appropriate attrs and table for array */
else if json_schema is array:
    Add join key called 'attr_name + <arr>' to relation
    rel_name
    new_rel = rel_name + "." + attr_name<arr>
    Create relation new_rel
    Add (id_jk: join_key) and (index: int) to new_rel
        /* recursively add attributes to the table (relation) */
        for each distinct item type item_type in json_schema:
            create_schema(item_type, new_rel, "val")
/* Primitive type, add column to the table (relation) */
else:
    If attr_name does not exist in relation rel_name:
        Add column (attr_name, attr_name's type) to relation
        rel_name
    else
        Rename attribute attr_name to attr_name + "<orignal
        attr_name's type>" in relation rel_name
        Add column (attr_name + "<" + attr_name's type + ">",
        attr_name's type) to relation rel_name
```

The above procedure will create the relational schema without the 1-to-1 optimization. A second pass may be performed through the relational schema, identifying object tables with 1-to-1 relationships and collapsing them. Alternatively, the 1-to-1-optimization could be performed inline, but this was not shown for clarity. When a sub-tree of the schema with nested objects is not "interrupted" by arrays or maps, then the entire object sub-tree can be collapsed into a single table with attributes named by their path to the root of the sub-tree. An attribute that is a map or object remains in a separate table, but any sub-objects contained within can be collapsed recursively. These principles apply to any arbitrary depth of nested objects.

Populating Indexes with Data

Once the JSON and relational schemas have been updated in response to a new object, the data contained within the object can be stored in indexes, as described below.

The indexes in the analysis platform rely on order-preserving indexes that store key-value pairs. The indexes support the operations: lookup(prefix), insert(key, value), delete(key), update(key, value), and get_next( ) for range searches. There are a number of data structures and low-level libraries that support such an interface. Examples include BerkeleyDB, TokyoCabinet, KyotoCabinet, LevelDB, and so on. These internally use order-preserving, secondary store data structures like B-trees, LSM (log-structured merge) trees, and Fractal trees. There may be special cases where non-order-preserving indexes (such as hash tables) are used, such as for object IDs. With non-order-preserving indexes, get_next( ) and the ability to do range searches may be sacrificed.

In various implementations, the analysis framework uses LevelDB, which implements LSM trees, does compression, and provides good performance for data sets with high insert rates. LevelDB also makes performance trade-offs that may be consistent with common use models for the analysis framework. For example, when analyzing data such as log data, data will be frequently added, but existing data will be infrequently, or never, changed. Advantageously, LevelDB is optimized for fast data insertion at the expense of slower data deletion and data modification.

Order-preserving indexes have the property that they collocate the key-value pairs in key order. Thus, when searching for key-value pairs nearby a certain key or retrieving items in order, the responses will return much faster than when retrieving items out of order.

The analysis platform can maintain multiple key-value indexes for each source collection, and in some implementations, between two and six indexes for each source collection. The analysis platform uses these indexes for evaluating SQL queries over the relational schema (the SQL schema does not need to be materialized). Each object is assigned a unique id denoted by tid. The two indexes from which the other indexes and the schemas can be reconstructed are the BigIndex (BI) and ArrayIndex (AI).

BigIndex (BI)

The BigIndex (BI) is the base data store that stores all fields in the data that are not embedded in an array. A value (val) can be retrieved from the BI by a key based on col_path and tid.
(col_path, tid)→val The col_path is the path to the field from the root object with the field's type appended. For example, for the following records:

```
1:    { "text": "Tweet this", "user": { "id": 29471497,
      "screen_name": "Mashah08" } }
2:    { "text": "Tweet that", "user": { "id": 27438992,
      "screen_name": "binkert" } }
``` the following key-value pairs are added to the BI:

```
(root.text<str>, 1) --> "Tweet this"
(root.text<str>, 2) --> "Tweet that"
(root.user.id<num>, 1) --> 29471497
(root.user.id<num>, 2) --> 27438992
(root.user.screen_name<str>, 1) --> "Mashah08"
(root.user.screen_name<str>, 2) --> "binkert"
``` in various implementations, the underlying index store (such as LevelDB) is unaware of the significance of the segments of the key. In other words, while "root.text<str>, 1" signifies the first element of the string text field in the root table, the index store may simply see an undifferentiated multi-character key. As a simple example, the key could be created simply by concatenating the col_path and tid (importantly, in that order). For example, the first key demonstrated above may be passed to the index store as "roottext<str>1." The index store will collocate the second key ("root.text<str>2") with the first key not because of any understanding of the path similarity, but simply because the first 14 characters are the same. Even though the column name and type are stored as part of every key, because of the sort ordering, compression (such as prefix-based compression) can be used to reduce the storage cost.

In the BI, all columns of the source data are combined into a single structure, unlike traditional column stores which create a separate column file for every new column. The BI approach allows for a single index instance and also enables map detection to be delayed. Since new fields simply appear as entries in the BI, failing to pivot a map does not incur the physical cost of creating a large number of physical files for each field later turned into a map.

In the BI, the key-value pairs for each attribute or "column" are collocated. Thus, like column files, the BI allows the query executor to focus on the fields of interest in a query rather than forcing it to sweep through data containing fields not referenced in a query.

ArrayIndex (AI)

Although fields from the normalized tables for arrays could be added to the BI, the array indices would then be from their corresponding values. Instead, array fields can be added to a separate ArrayIndex (AI) that preserves the index information and allows entries in the same array to be collocated by the index store, which provides good performance for many queries. The array values can be stored in the Ai using the following signature:

(col_path, tid, join_key, index)→val

The col_path is the path of the array field: for example, "root.tags" for elements in the tags array, or "root.tags.text" for the "text" field in an object inside the tags array. The join_key and index are the array's foreign key and index of the value. The tid is also stored, to avoid having to store a separate entry in the BI for each array. The tid can be used to look up values for corresponding columns in the same object. Consider the objects that represent hashtags in different tweets:

| 1: | { "id": 3465345, "tags": [ "muffins" "cupcakes" ] } |
| 2: | { "id": 3465376, "tags": [ "curry" "sauces" ] } |

For these, the tags table has the following schema:
Root.tags<arr>(id_jk: join_key, index: int, val: string)
For that table, the entries in the AI would be:

| (root.tags<arr>, 1, 1, 0) --> "muffins" |
| (root.tags<arr>, 1, 1, 1) --> "cupcakes" |
| (root.tags<arr>, 2, 2, 0) --> "curry" |
| (root.tags<arr>, 2, 2, 1) --> "sauces" |

The array index allows for quickly iterating through the values of array fields. This is useful, for example, when running statistics over these fields (e.g., sum, average, variance, etc.), finding specific values, etc.

Nested Array Example

Note that, for arrays in the root object (top-level arrays), the tid and join_key fields are redundant (see above) and can be optimized away. However, for nested arrays, a separate join_key is needed and not superfluous. For example, consider this JSON object:

| 1: | {"id": 3598574, "tags": [ [8, 25, 75], ["muffins", "donuts", "pastries"]]} |

The corresponding relational schema is:

| Root.tags<arr>(id_jk: join_key, index: int, val<arr>: join_key) |
| Root.tags<arr>.val<arr>(id_jk: join_key, index: int, val<num>: num, val<str>: str) |

Recall that the AI uses the following key-value pair
col_path, tid, join_key, index→val
which results in these AI entries

| tags<arr>.val<arr>, 1, 1, 0 -> 1 |
| tags<arr>.val<arr>, 1, 1, 1 -> 2 |
| (numbers array) |
| tags<arr>.val<arr>.val<num>, 1, 1, 0 -> 8 |
| tags<arr>.val<arr>.val<num>, 1, 1, 1 -> 25 |
| tags<arr>.val<arr>.val<num>, 1, 1, 2 -> 75 |
| (string array) |
| tags<arr>.val<arr>.val<str>, 1, 2, 0 -> "muffins" |
| tags<arr>.val<arr>.val<str>, 1, 2, 1 -> "donuts" |
| tags<arr>.val<arr>.val<str>, 1, 2, 2 -> "pastries" |

Note that if the join key were removed from the nested array key-value pairs, then it would not be possible to know whether muffins was part of the first nested array or the second. Thus, the join key is redundant for a top-level array, but not for cases of nested arrays.

Array Index 2 (AI2)

Although these two indexes (BI and AI) are sufficient to reconstruct all the ingested data, there are access patterns that they do not support efficiently. For these, we introduce the following indexes, which can optionally be created to improve performance at the cost of additional space.

This has the signature:
(col_path, index, tid, join_key)→val
which allows specific index elements of an array to be found quickly. For example, returning all tags at index 10 (tags[10]) is simple and fast using AI2.

Map Index (MI)

The map index is similar to the array index in its functionality and signature:
(col_path, tid, join_key, map_key)→val The primary difference is that the map index is not built during initial ingestion, and is instead constructed asynchronously. During initial loading, maps will be treated as objects and inserted into the BI as usual. Once both are populated, there are entries available in both the BI and MI for more efficient query processing. The BI entries remain relevant in case a user or administrator requests that the map be unadorned. Only the relational schema needs to be changed, and the original BI entries corresponding to the unmapped data will then be used in queries.

Like the AI, the MI is useful when iterating through the elements of a map: for applying statistical functions, for restricting to specific field names, etc. Consider again objects that maintain pageview statistics:

```
1:      { "url": "noudata.com/blog",
          "page_views": { "2012-12-01": 10, "2012-12-02": 12, . . .
          "2012-12-15": 10 }
2:      { "url": "noudata.com/jobs",
          "page_views": { "2012-12-01": 2, "2012-12-02": 4, . . .
          "2012-12-15": 7 }
```

The relational schema for the page_views table if flagged as a map is:

```
Root.page_views<map> (id_jk: join_key, key: string, val:
    num)
  where key is the map's key and val is the associated value.
    For the above objects, the entries in the MI would be:
    (root.page_views<map>, 1, 1, "2012-12-01") --> 10
    (root.page_views<map>, 1, 1, "2012-12-02") --> 12
    . . .
    (root.page_views<map>, 1, 1, "2012-12-15") --> 10
    (root.page_views<map>, 2, 2, "2012-12-01") --> 2
    (root.page_views<map>, 2, 2, "2012-12-02") --> 4
    . . .
    (root.page_views<map>, 2, 2, "2012-15-05") --> 7
```

This ordering allows the values in the page_views map to be collocated for each page, while in the BI, the values would be collocated by date.

Map Index 2 (MI2)

In addition, an auxiliary map index may be implemented. The map index is similar to the array index in its functionality and signature:
(col_path, map_key, tid, join_key)→val
This allows efficient searches for specific map elements, such as "all the different values coresponding to map key 2012-12-05." A generic representation of both AI2 and MI2 can be written as follows:
(col_path, key, tid, join_key)→val
where key corresponds to the index of an array or the map_key of a map.

ValueIndex (VI)

Although the above indexes are useful for looking up values for specific fields and iterating through those values, they do not allow fast access if queries are looking only for specific values or ranges of values. For example, a query may ask to return the text of tweets written by "mashah08". To assist such queries, a ValueIndex can be built for some or all fields in the schema. The ValueIndex may be built as data is ingested or be built asynchronously later. The key for the value index is:
(col_path, val)
where val is the value of the attribute in the source data. The corresponding value to that key in the VI depends on where the field for the value occurs. For each of the indexes above, it varies:

```
BI: (col_path, val) --> tid
AI: (col_path, val) --> tid, join_key, index
MI: (col_path, val) --> tid, join_key, key
```

For example, the tweets:

```
1:      { "text": "Tweet this", "user": { "id": 29471497,
          "screen_name": "mashah08" } }
2:      { "text": "Tweet that", "user": { "id": 27438992,
          "screen_name": "binkert" } }
``` are stored as:

```
(root.text<string>, "Tweet this")              --> 1
(root.text<string>, "Tweet that")              --> 2
(root.user.id<num>, 29471497)                  --> 1
(root.user.id<num>, 27438992)                  --> 2
(root.user.screen_name<string>, "Mashah08")    --> 1
(root.user.screen_name<string>, "binkert")     --> 2
```

Using the VI, one can search for all tweets authored by "mashah08" by looking for the key: (root.user.screen_name, "mashah08") and retrieving all associate tids. Then the BI can be searched using the retrieved tids to return the corresponding text of each tweet.

The cost of indexes, and especially the value index, is the additional storage space, and the execution time needed to update them as new objects are added to the system. Due to space or update overheads, the user may not want to index all possible paths because of these. So, the user can specify which paths to index in the VI.

RowIndex (RI)

To facilitate re-creation of an entire ingested object (similar to requesting a record in a traditional row-based store), a RowIndex (RI) can be implemented. The RowIndex stores a key-value pair tid-->JSON object The JSON object may be stored as a string representation, as a BSON, or as any other serialized format, such as a tree structure used for internal representation of a JSON object. For the two tweets discussed above with respect to the VI, the corresponding RI entries would be:

```
1 --> { "text": "Tweet this", "user": { "id": 29471497,
         "screen_name": "mashah08" } }
2 --> { "text": "Tweet that", "user": { "id": 27438992,
         "screen_name": "binkert" } }
```

EXAMPLE

An example for the BI, AI, MI, and VI. Consider tweets similar to the above, where a "retweet_freq" attribute is added, which keeps track of how many times a tweet was retweeted in a day:

```
1: { "text": "Love #muffins and #cupcakes: bit.ly/955Ffo",
     "user": { "id": 29471497, "screen_name": "mashah08" },
     "tags": [ "muffins", "cupcakes" ],
     "retweet_freq": { "2012-12-01": 10, "2012-12-02": 13,
     "2012-12-03": 1 } }
2: { "text": "Love #sushi and #umami: bit.ly/955Ffo",
     "user": { "id": 28492838, "screen_name": "binkert" },
     "tags": [ "sushi", "umami" ],
     "retweet_freq": { "2012-12-04": 20, "2012-12-05": 1 } }
```

The schema for these records is:

O{ "text": string, "user": O{ "id": number,
  "screen_name": string }, "tags": [ string ],
  "retweet_freq": M{ "2012-12-01": number ... "2012-12-05": number } }

The JSON-Schema for these records will be

```
{
    "type": "object",
    "obj_type": "object",
    "properties": {
        "text": {
            "type": "string"
        },
        "user": {
            "type": "object",
            "obj_type": "object",
            "properties": {
                "id": {
                    "type": "number",
                },
                "screen_name": {
                    "type": "string",
                }
            }
        },
        "tags": {
            "type": "array",
            "items": {
                "type": "string"
            }
        },
        "retweet_freq": {
            "type": "object",
            "obj_type": "map",
            "properties": {
                "2012-12-01": {
                    "type": "number"
                },
                ...
                "2012-12-05": {
                    "type": "number"
                }
            }
        }
    }
}
```

If retweet_freq is not treated as a map, the relational schema is:

Root (text: str,
  user.id: num, user.screen_name: str,
  tags<arr>: join_key,
  retweet_freq.2012-12-01: num,
  retweet_freq.2012-12-02: num,
  retweet_freq.2012-12-03: num,
  retweet_freq.2012-12-04: num,
  retweet_freq.2012-12-05: num)
Root.tags<arr> (id_jk: join_key,
  index: int,
  val: str)

In this case, the example records above would populate these relations as follows:

Root:
  ("Love #muffins ...", 29471497, mashah08, 1, 10, 13, 1, NULL, NULL)
  ("Love #sushi ...", 28492838, binkert, 2, NULL, NULL, NULL, 20, 1)
Root.tags<arr>:
  (1, 0, "muffins")
  (1, 1, "cupcakes")
  (2, 0, "sushi")
  (2, 1, "umami")

Note that these are the tuples the queries would return if a "select*" query were run on these tables. These tuples are not necessarily materialized as such in the storage engine. That is, this may simply be a virtual view over the underlying data, and not physically stored as depicted.

If retweet_freq is identified as a map, the relational schema becomes more concise (and more accommodating of additional data), as follows:

Root (text: str,
  user.id: num, user.screen_name: str,
  tags<arr>: join_key,
  retweet_freq<map>: join_key)
Root.tags<arr> (id_jk: join_key,
  index: int,
  val: str)
Root.retweet_freq<map> (id_jk: join_key,
  key: str,
  val: num)

The corresponding tuples are:

Root:
  ("Love #muffins ...", 29471497, mashah08, 1, 1)
  ("Love #sushi ...", 28492838, binkert, 2, 2)
Root.tags<arr>:
  (1, 0, "muffins")
  (1, 1, "cupcakes")
  (2, 0, "sushi")
  (2, 1, "umami")
Root.retweet_freq<map>:
  (1, "2012-12-01", 10)
  (1, "2012-12-02", 13)
  (1, "2012-12-03", 1)
  (2, "2012-12-04", 20)
  (2, "2012-12-05", 1)

The key-value pairs added to the BI are:

(root.retweet_freq.2012-12-01, 1) --> 10
(root.retweet_freq.2012-12-02, 1) --> 13
(root.retweet_freq.2012-12-03, 1) --> 1
(root.retweet_freq.2012-12-04, 2) --> 20
(root.retweet_freq.2012-12-05, 2) --> 1
(root.text, 1) --> "Love #muffins and #cupcakes"
(root.text, 2) --> "Love #sushi and #umami"
(root.user.id, 1) --> 29471497
(root.user.id, 2) --> 28492838
(root.user.screenname, 1) --> mashah08
(root.user.screen_name, 2) --> binkert The key-value pairs added to the AI are as follows. Note that in this case, the join key is redundant (same as tid) since there are no nested arrays.

```
(root.tags<arr>, 1, 1, 0) --> "muffins"
(root.tags<arr>, 1, 1, 1) --> "cupcakes"
(root.tags<arr>, 2, 2, 0) --> "sushi"
(root.tags<arr>, 2, 2, 1) --> "umami"
```

The RI will have the following two entries

```
1 --> { "text": "Love #muffins and #cupcakes:
    bit.ly/955Ffo", "user": { "id": 29471497, "screen_name":
    "mashah08" }, "tags": [ "muffins", "cupcakes" ],
    "retweet_freq": { "2012-12-01": 10, "2012-12-02": 13,
    "2012-12-03": 1 } }
2 --> { "text": "Love #sushi and #umami: bit.ly/955Ffo",
    "user": { "id": 28492838, "screen_name": "binkert" },
    "tags": [ "sushi", "umami" ], "retweet_freq": { "2012-
    12-04": 20, "2012-12-05": 1 } }
```

If and when it is built, the MI will have the following entries:

```
(root.retweet_freq<map>, 1, 1, "2012-12-01") --> 10
(root.retweet_freq<map>, 1, 1, "2012-12-02") --> 13
(root.retweet_freq<map>, 1, 1, "2012-12-03") --> 1
(root.retweet_freq<map>, 2, 2, "2012-12-04") --> 20
(root.retweet_freq<map>, 2, 2, "2012-12-05") --> 1
```

Similarly the VI will have the following entries (if all paths are indexed and maps are treated like maps):

```
(root.retweet_freq<map>, 1)              --> 2, 2, "2012-12-05"
(root.retweet_freq<map>, 1)              --> 1, 1, "2012-12-03"
(root.retweet_freq<map>, 10)             --> 1, 1, "2012-12-01"
(root.retweet_freq<map>, 13)             --> 1, 1, "2012-12-02"
(root.retweet_freq<map>, 20)             --> 2, 2, "2012-12-04"
(root.tags<arr>, "cupcakes")             --> 1, 1, 1
(root.tags<arr>, "muffins")              --> 1, 1, 0
(root.tags<arr>, "sushi")                --> 2, 2, 0
(root.tags<arr>, "umami")                --> 2, 2, 1
(root.text<str>, "Love #muffins and #cupcakes")  --> 1
(root.text<str>, "Love #sushi and #umami")       --> 2
(root.user.id, 29471497)                 --> 1
(root.user.id, 28492838)                 --> 2
(root.user.screen_name, "mashah08")      --> 1
(root.user.screen_name, "binkert")       --> 2
```

Although the actions above are described in phases, they can be pipelined to allow the ingest to be performed in a single pass, loading the BI, AI, and RI, and computing the JSON schema. The other indexes can be built asynchronously and can be enabled and disabled as desired.

System Architecture

The analysis platform is architected to be service-oriented. In various implementations, there are five main services: a proxy, a metadata service, a query executor, a storage service, and an ingestion service.

This decoupled approach may have several advantages. Since these services communicate only through external APIs (remote procedure calls), the services can be multiplexed and each shared independently. For example, multiple proxies may be used per executor and multiple executors per storage service. The metadata service can also be shared across multiple instances of executor and storage services.

The executor, storage, and ingestion services are parallelized, and can run the individual pieces in virtualized machine instances in either private or public infrastructures. This allows suspending and scaling these services independently. This is useful for reducing costs by adjusting service capacity based on fluctuations in demand. For example, the elasticity of a public cloud can be used to highly parallelize the ingestion service for fast overnight loading, while keeping the execution and storage service reduced in size for daily query workloads.

The proxy is the gateway to clients and supports one or more standard protocols, such as ODBC (Open Database Connectivity), libpq, JDBC (Java Database Connectivity), SSL (secure sockets layer), etc. The gateway serves as a firewall, authentication service, and a locus of control for the internal services. For example, client connections (such as network sockets) can be kept open at the proxy while the supporting execution and storage services are suspended to save costs. When the client connection becomes active again, the needed services can be woken on-demand with a relatively short start-up latency.

The metadata service is typically shared by many instances of the other services. It stores metadata including schemas, source information, partitioning information, client usernames, keys, statistics (histograms, value distributions, etc.), and information about the current state of each service (number of instances, IP addresses, etc.).

The storage service manages indexes and serves read and write requests. In addition, the query executor can push down a number of functions into the storage service. In various implementations, the storage service can evaluate predicates and UDFs (user defined functions) to filter results, evaluate local joins (e.g., to reconstruct objects), evaluate pusheddown joins (e.g., broadcast joins), and evaluate local aggregations.

The storage service can be parallelized through a technique called partitioned parallelism. In this approach, numerous instances or partitions of the storage service are created and the ingested objects are divided among the partitions. Each partition stores each type of index, just as if it were a single whole instance. However, each partition only indexes a subset of the ingested data.

The analysis engine supports one or more partitioning strategies. A simple but effective strategy is to partition the objects by tid and store their respective entries in the local indexes. In this way, ingested objects are not split across different instances, which may consume significant network bandwidth when a query relies on multiple portions of an object. The tid can be assigned in a number of ways, including hash assignment, round robin, or range-based assignment. These particular assignments distribute the most recent data across all the instances, thereby spreading the load.

Another strategy is to partition by another field value (or combination of field values), such as a user id or session id. Alternate partitioning fields (columns) make it convenient to perform local joins with other tables or collections, e.g., user profiles. The partitioning strategy may be hash partitioning or use sampling and range partitioning. The former is used for efficient point lookups and the latter for supporting efficient range searches.

Regardless of the partitioning strategy, an object or any subset of the object should be able to be reconstructed locally. Therefore, the storage service partitions have no cross talk during query processing and only need to communicate with the execution service via their API.

The storage service has a cache. We can increase the cache size in each partition or increase the number of partitions to improve the performance of the storage service. The storage service can cache the indexes in memory or on local disk, and the indexes can live on external storage like Amazon S3. This feature allows for shutting down and destroying the storage service nodes and redeploying them whenever necessary. Moreover, it allows extreme elasticity: the ability to hibernate the storage service to S3 at low cost and change storage service capacity as demand fluctuates.

The query execution service executes the query plan generated by the query planning phase. It implements query operators, e.g., join, union, sort, aggregation, and so on. Many of these operations can be pushed down to the storage service, and are when possible. These include predicates, projection, columnar joins to reconstruct the projected attributes, and partial aggregations for distributive and algebraic aggregation functions with group by statements.

The query execution service takes in data from the storage service and computes the non-local operations: non-local joins, group by statements that need repartitioning, sorts, and so on. The executor is similar to a partitioned parallel executor. It uses exchange operators to repartition between query execution steps and employs local storage for spilling intermediate results. For many queries, it is possible to run most of the query in the storage service and require only a single executor node to collect the results and perform any small non-local operations.

Ingestion Service

The ingestion service is responsible for loading semi-structured data into the storage service where it can be queried. Users provide data in a variety of formats (e.g., JSON, BSON, CSV) from a variety of platforms (e.g., MongoDB, Amazon S3, HDFS), optionally compressed with a compression mechanism (e.g., GZIP, BZIP2, Snappy). The basic procedure holds true regardless of the format used.

The ingestion task can be roughly divided into two parts: the initial ingestion task that loads a large volume of new user data, and incremental ingestion, which occurs periodically when new data is available.

Initial Ingestion

The initial ingestion process can be broken into several steps. First, partition input data into chunks. Users provide initial data in a collection of files or by providing direct connections to their data sources. The location and format of these files is recorded in the metadata service. Users may provide data that is already partitioned, for instance due to log file rotation, but if not, the files can be partitioned into chunks to support parallel loading. These chunks are typically on the order of several hundred megabytes and are processed independently.

The exact mechanism for partitioning the input files depends on the data format. For uncompressed formats in which records are separated by newlines, (e.g., JSON or CSV), a single file can be processed in parallel using a number of processes equal to the target number of chunks. Processing starts at the appropriate offset in the file (file_size/total_num_chunks)*chunk_num, and then searching until a newline is found. For compressed data or data in a binary format like BSON, each input file may need to be scanned sequentially. The location of each chunk (file, offset, size) is stored in the metadata service.

Once the data is divided into chunks, the actual schema inference and ingestion is performed. As part of this process, two services are launched: the ingestion service and the storage service. These two services can employ multiple servers to do the work. The two services can also be co-located on any given machine. The ingestion service is transient and used only during the ingestion process, while the storage service holds the actual data and must be persistent. The servers involved in ingestion send data to the storage service servers and the number of ingestion servers is independent of the number of storage servers where the number is chosen to minimize imbalance between the throughput of each service. The chunks are partitioned between the ingestion servers. Each ingestion server is responsible for the following steps for each chunk assigned to it: (i) parsing and type inference, (ii) communication with storage service, and (iii) computing local schema and statistics.

First, the data record is parsed into an internal tree representation. A consistent internal representation may be used for all the source formats (JSON, BSON, etc.). Depending on the input format, type inferencing may also be performed. For instance, JSON does not have a representation of a date, so it is common to store dates as strings. Since dates are very common, they are on example of a type detected during ingestion so that users can issue queries making use of dates. For CSV input files, since the columns are not typed, basic types such as integers must be detected as well.

Once the record has been parsed and types inferred, a compressed representation of the parse tree is sent to the storage service. This takes the form of a preorder traversal of the tree. The storage service is responsible for determining the values to store in each of the indexes (BI, AI, etc), and for generating tuple ids and join keys. Key generation is deferred to the storage service so that keys can be generated sequentially, which improves ingestion performance to the underlying index store.

As records are ingested, a local JSON schema is updated using the rules described above. The schema will reflect the records seen by a single ingestion machine, and different machines may have different schemas.

In addition to computing the schema, statistics are maintained, which are useful for query processing as well as identifying maps. These include metrics like the number of times each attribute appears as well as its average size in bytes. For example, the following records

```
{ id: 3546732984 }
{ id: "3487234234" }
{ id: 73242342343 }
{ id: 458527434332 }
{ id: "2342342343" }
``` would produce the schema {id: int, id: string}, and id: int could be annotated with a count of 3 and id: string with a count of 2. Each ingestion machine stores the schema and statistics it computed in the metadata service.

Once all of the chunks have been ingested, the overall schema is computed, which will be used by the query engine and presented to the user. This can be accomplished using a single process that reads the partial schemas from the metadata service, merges them using the method described above, and stores the result back in the metadata service. Since the number of schemas is limited to the number of ingestion machines, this process is not performance-critical.

Determining maps is optional. As described previously, heuristics can be used along with the statistics stored in the metadata service to determine which attributes should be stored as maps in the MI. Recall that this is not necessary for query processing, but it makes some queries more natural to express and improves efficiency. Once maps have been identified, each storage server receives a message identifying which attributes should be maps. The storage server then scans these columns and inserts them into the MI.

Incremental Updates

Some users may load the bulk of their data up front, but most will periodically load new data over time, often as part of a regular (e.g., hourly or daily) process. Ingesting this data is largely similar to the initial ingestion. The new data is split into chunks, the schema is computed per chunk, and the local schemas are merged with the global schema maintained in the metadata service.

The system automatically detects new data as it is added. The method depends on the source data platform. For example, for S3 files, the simplest case is to detect changes in an S3 bucket. A special process periodically scans the bucket for new key-value pairs (i.e., new files), and adds any that are found to the metadata service. After a certain number of new files have been found or a certain time period has elapsed, the process launches a new ingestion process to load the data.

Operations performed in MongoDB can be stored in a special collection called the operation log (or oplog). The oplog provides a consistent record of write operations that is used by MongoDB internally for replication. The oplog is read and used to create a set of flat files in S3 storing the new records. The above method can then be used to ingest the new data.

The incremental ingestion process can handle both new data (e.g. new JSON documents) and updates to existing documents (e.g. new attributes in existing JSON documents or new values for existing attributes). Each data source platform has different capabilities in terms of exposing updates in the source files. We refer to this type of information as 'deltas' and it can take the form of flat files or log files (e.g. MongoDB). The incremental ingestion process processes the information from the 'delta' files and combines that with the existing schema information to generate new data that are sent to the storage service.

Subsetting Data

While the system described here for ingesting data and doing incremental updates can ingest all data from the source, it is relatively simple to ingest only a subset, by specifying up-front the JSON schema (or the relational schema) of the data that we would like ingested. This is done by either providing the JSON schema itself, or by providing queries that specify the subset. In this manner, the analysis platform can be thought of as a materialized view of the source data.

It is also possible to specify data that the user does not want ingested. A JSON schema or a relational schema can be provided, describing the portion of the data that should not be ingested. Then it is simply a matter of recording that information in the metadata service which tells the ingestion process to simply skip those elements of all future rows. If this is done after data has already been ingested, the already ingested data simply becomes unavailable and can be garbage collected by a background task. This garbage collection would be incorporated into the compaction process of the index store (e.g., LevelDB).

Fault Tolerance

While it is possible to restart the loading process during the initial ingest, the incremental ingestion process should not corrupt the existing data in the system, to prevent users from having to reload all data from scratch. Since ingesting a file is not an idempotent operation, due to id generation, a simple fault-tolerance scheme can be implemented based on taking snapshots of the underlying storage system.

Taking snapshots may be straightforward when the underlying storage system supports taking consistent snapshots at a point in time, as LevelDB does. With this primitive, the steps for incremental loading are as follows. A single process directs each storage server to take a snapshot locally and directs all queries to this snapshot for the duration of the load. Each chunk is loaded as described above. When complete, the ingestion server responsible for loading a chunk marks it as finished in the metadata service.

A process monitors the metadata service. When all chunks have been loaded, it atomically redirects queries to the updated version of the state. The snapshot taken in the first step can then be discarded. In the event of a failure, the snapshot becomes the canonical version of the state and the partially updated (and potentially corrupted) original version of the state is discarded. The ingestion process is then restarted. Additionally, snapshots of the storage system disk volume can be used for recovery in the event of a server failure.

Query Execution

Example Query

To show example execution, consider the simple query: select count(*) from table as t where t.a>10; First, the proxy receives the query and issues it to an executor node for planning. Next, an executor node creates a query plan calling the metadata service to determine which collections and storage nodes are available for use. The executor node typically distributes the plan to other executor nodes, but here, we only need a single executor node.

Execution node then makes RPC calls to storage service nodes, pushing down t.a>10 predicate and count function. Next, storage nodes compute sub-counts and return them to executor node. Executor node then returns result to the proxy when proxy fetches the next result value.

Dynamic Typing

The storage engines of database systems (e.g., PostgreSQL) are strongly typed, which means that all the values of a column (or attribute) must have the exact same type (e.g., integer, string, timestamp, etc.). In the context of big-data analytics this is a significant limitation because quite often applications need to change the representation of a particular piece of information (attribute) and, consequently, the data type that they use to store it. For instance, an application may initially store the values of a particular attribute using integers and then switch to using floats. Database systems are not designed to support such operations.

One way to handle this problem is to use multiple relational columns for each attribute—one for each different data type. For example, if we have seen the attribute "user.id" with values 31432 and "31433" (i.e., an integer and a string), we can store "userid<int>" and "userid<string>" as separate columns. A single record will have a value for only one of these columns corresponding to the type of "user.id" in that record. The values for the other columns for that record will be NULL.

Presenting multiple columns for the same attribute is often too complicated for users to use. To simplify the user experience, the analysis platform can dynamically, at query time, infer the type the user intends to use. To this end, the storage service keeps track of multiple types. For example, the storage service uses a generic data type for numbers, called NUMBER, which covers both integers and floats. When the NUMBER type is used, the more specific data type is stored as part of the value. For example, the integer value 10 of attribute "Customer.metric" is stored in the BI as a key-value pair where (Customer.metric, <NUMBER>, tid) is the key and (10, INTEGER) is the value. The floating point value 10.5 of the same attribute would be stored as key: (Customer.metric,<NUMBER>, TID), value: (10.5, FLOAT).

Finally, at query time, the analysis platform can perform dynamic casting between data types according to the properties of the query (predicates, casting operations, etc.) as long as these operations do not result in information loss. Although "number" is not an ANSI SQL type, the flexible typing system allows clients to treat it as a standard ANSI SQL float, integer, or numeric type from query context. For example, consider the query:
select user.lang from tweets where user.id='31432'
In the case where we have both "userid<int>" and "userid<string>", the system optionally converts integers (e.g. 31432) to a single string representation (e.g. "31432") at query time, thereby allowing the user to work with a single column "user.id" with the ANSI SQL type VARCHAR.

Although ANSI (American National Standards Institute)/ISO (International Organization for Standardization) SQL:2003 is mentioned as an example, in other implementations compliance with other standards, SQL or otherwise, can be accomplished. For example only, the exposed interface could be compliant with ANSI/ISO SQL:2011.

FIGURES

In FIG. 1A, an example cloud-based implementation of the analysis platform is shown. A local area network (LAN) or a wide area network (WAN) 100 of an organization using the analysis framework connects to the internet 104. Compute needs and storage needs in this implementation are both provided by cloud-based services. In the particular implementation shown, compute servers are separate from storage servers. Specifically, a compute cloud 108 includes a plurality of servers 112 that provide processing power for the analysis framework. The servers 112 may be discrete hardware instances or may be virtualized servers.

The servers 112 may also have their own storage on which the processing capability operates. For example, the servers 112 may implement both the query executor and the storage service. While traditional columnar storage systems store data as columns on disk, when that data is read into memory, rows are reassembled from the columnar data. The indexes of present disclosure, however, operate as columnar storage both on disk and in memory. Because of the unique configuration of the indexes, benefits of fast columnar access can be achieved with relatively little penalty.

A storage cloud 116 includes storage arrays 120 used for index data because according to the present disclosure data is stored in indexes and not in materialized tables. When storage resources of the servers 112 are used the storage arrays 120 may be used for backup and nearline storage, not for responding to each query.

In various implementations, storage arrays 124 may include data on which the analysis framework will operate. For example only, the storage arrays 124 may hold relevant data, such as log data, which users may want to query using the analysis framework. Although storage arrays 120 and storage arrays 124 are shown in the same storage cloud 116, they may be located in different clouds, including private externally hosted clouds, public clouds, and organization-specific internally-hosted virtualized environments.

For example only, the storage cloud 116 may be an Amazon Web Services (AWS) S3 cloud, which the business was already using to store data in the storage arrays 124. As a result, transferring data into the storage arrays 120 may be achieved with high throughput and low cost. The compute cloud 108 may be provided by AWS EC2 in which case the compute cloud 108 and the storage cloud 116 are hosted by a common provider. A user 130 constructs a query using standard SQL tools, that query is run in the compute cloud 108, and a response is returned to the user 130. The SQL tools may be tools already installed on a computer 134 of the user 130, and do not have to be modified in order to work with the present analysis framework.

Figure 1B:
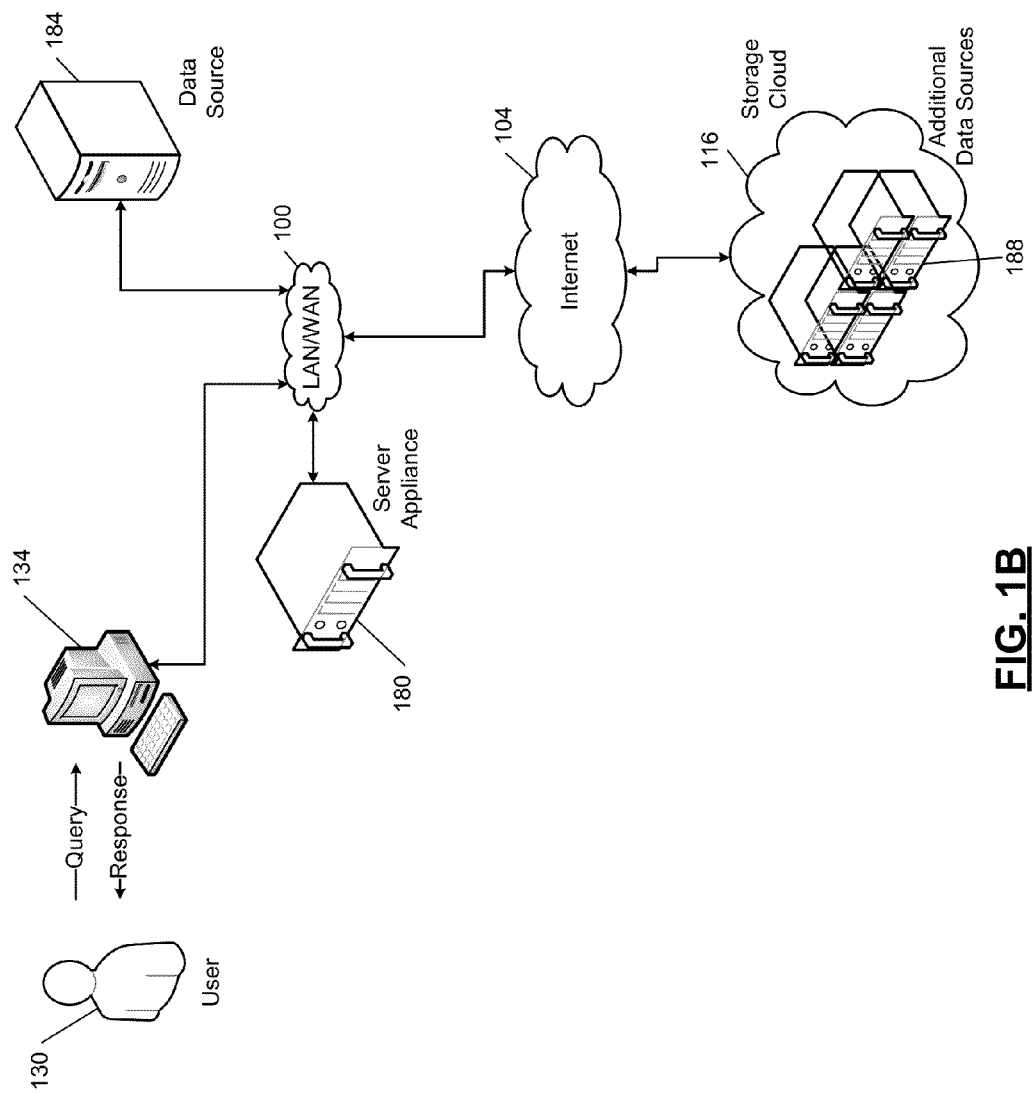
FIG. 1B depicts an example network architecture for a scalable analysis platform for semi-structured data with a server appliance at the user end.

In FIG. 1B, another example deployment approach is shown. In this case, a physical server appliance 180 is connected to the LAN/WAN 100 of the business. The server appliance 180 may be hosted onsite or may be hosted offsite and connected, such as with a virtual private network, to the LAN/WAN 100. The server appliance 180 includes compute capability as well as storage and receives input data from sources, which may be local to the LAN/WAN 100. For example only, a computer or server 184 may store logs, such as web traffic logs or intrusion detection logs.

The server appliance 180 retrieves and stores index data for responding to queries of the user 130. The storage cloud 116 may include additional data sources 188, which may hold yet other data and/or may be a nearline data storage facility for older data. The server appliance 180 may, in order to satisfy user queries, retrieve additional data from the additional data sources 188. The server appliance 180 may also store data, such as for backup purposes, in the storage cloud 116. In various other implementations, the additional data sources 188 may be part of a Hadoop implementation in the cloud.

The analytical framework of the present disclosure is flexible such that many other deployment scenarios are possible. For example only, software may be provided to a business, and that software could be installed on owned or hosted servers. In another implementation, virtual machine instances may be provided, which can be instantiated through virtualization environments. Still further, the user could be provided with a user interface in a browser and the SQL portion could be hosted by a service provider, such as Nou Data, and implemented on their systems or in the cloud.

Figure 1C:
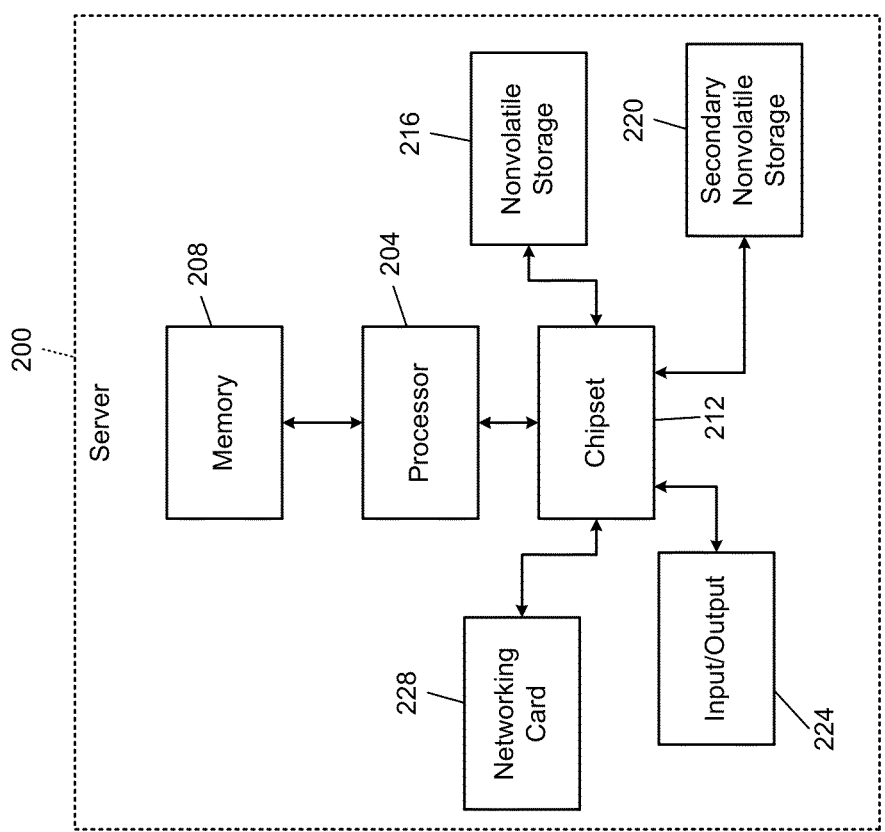
FIG. 1C is a functional block diagram of a server system.

In FIG. 1C, hardware components of a server 200 are shown. A processor 204 executes instructions from a memory 208 and may operate on (read and write) data stored in the memory 208. Generally, for speed, the memory 208 is volatile memory. The processor 204 communicates, potentially via a chipset 212, with nonvolatile storage 216. In various implementations, nonvolatile storage 216 may include flash memory acting as a cache. Larger-capacity and lower-cost storage may be used for secondary nonvolatile storage 220. For example, magnetic storage media, such as hard drives, may be used to store underlying data in the secondary nonvolatile storage 220, the active portions of which are cached in nonvolatile storage 216.

Input/output functionality 224 may include inputs such as keyboard and mouse, and outputs such as a graphic display and audio output. The server 200 communicates with other computing devices using a networking card 228. In various implementations or at various times, the input/output functionality 224 may be dormant, with all interaction between the server 200 and external actors being via the networking card 228. For ease of illustration, additional well-known features and variations are not shown, such as, for example only, direct memory access (DMA) functionality between nonvolatile storage 216 and memory 208 or between the networking card 228 and the memory 208.

Figure 2A:
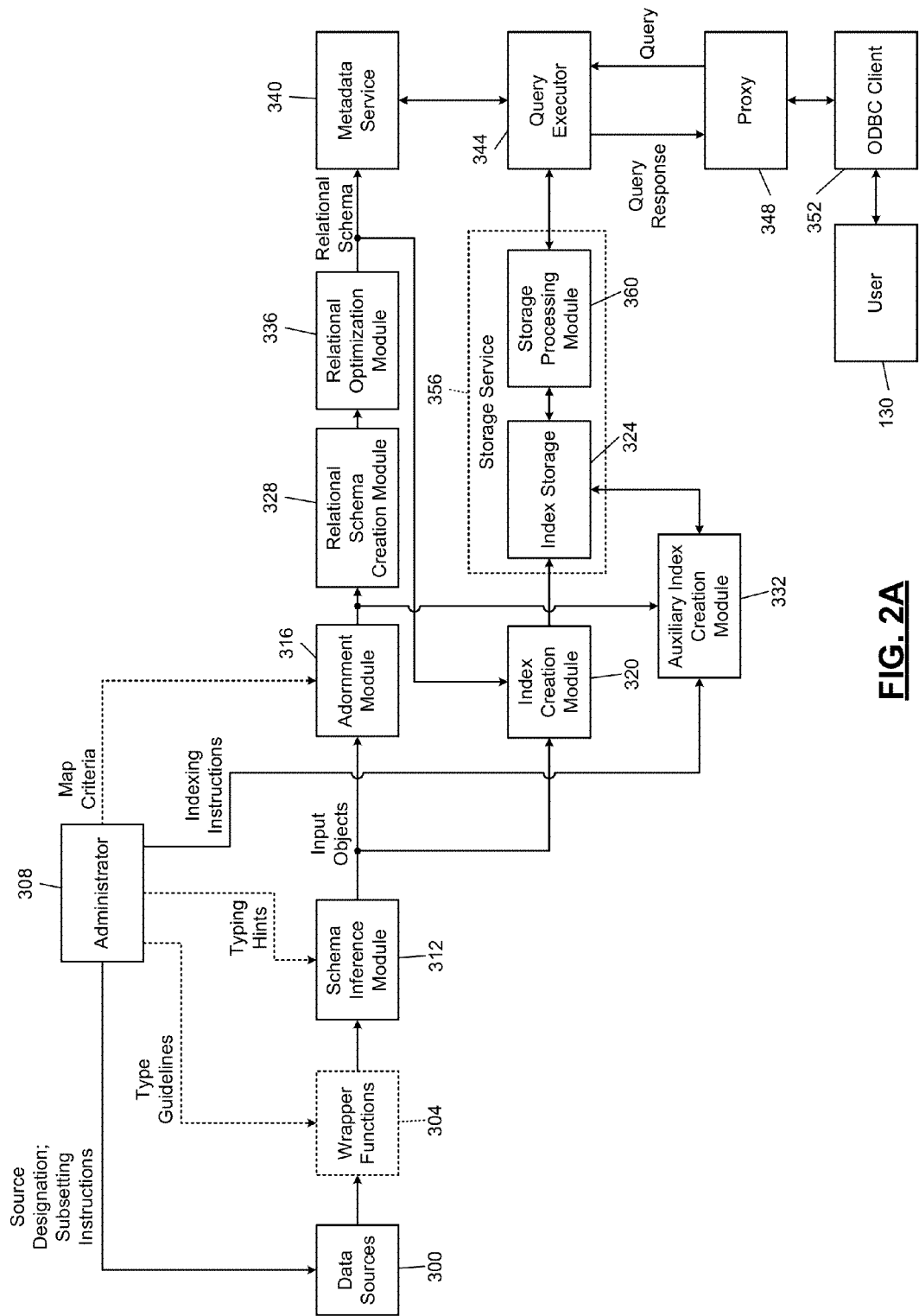
FIG. 2A is a functional block diagram of an example scalable analysis platform for semi-structured data.

In FIG. 2A, a process diagram shows one example of how data is ingested into the analytical framework so that it can be queried by the user 130. Data sources 300 provide data on which the analysis framework operates. If that raw data is not self-describing, optional user-defined wrapper functions 304 may convert the raw data into self-describing semi-structured data, such as JSON objects.

An administrator 308, which may be the user 130 operating in a different capacity, is able to designate guidelines for implementing these wrapper functions. Administrator 308 can also designate which of the data sources 300 to use and what data to retrieve from those data sources. In various implementations, retrieving the data may include subsetting operations and/or other computations. For example only, when one of the data sources 300 is Hadoop, a MapReduce job may be requested prior to retrieving the data for the analysis framework.

The retrieved data is processed by a schema inference module 312, which dynamically constructs the schema based on the observed structure of received data. The administrator 308 may have the ability, in various implementations, to provide typing hints to the schema inference module 312. For example, the typing hints may include requests to recognize particular formats, such as dates, times, or other administrator-defined types, which may be specified by, for example, regular expressions.

The data objects and the schema generated by the schema inference module 312 are provided to an adornment module 316 as well as an index creation module 320. Input objects include source data as well as metadata that describes the source data. The source data is stored in index storage 324 by the index creation module 320.

The adornment module 316 identifies maps in the schema generated by the schema module 312. In implementations where map identification is not desired, the adornment module 316 may be omitted. The administrator 308 may be able to specify map criteria to adjust the heuristics performed by the adornment module 316 used in identifying maps.

After maps have been identified, a relational schema creation module 328 generates a relational schema, such as an SQL-compliant schema. In addition, the identified maps are provided to an auxiliary index creation module 332, which is capable of creating additional indexes, such as the Mapindex, and map entries in the ValueIndex, as described above. The auxiliary indexes may also be stored in the index storage 324.

The administrator 308 may have the capability of requesting that the map index be created and may specify which column to add to the value index. In addition, the administrator may be able to specify which objects should be treated as maps, and can dynamically change whether an object is treated as a map or not. Such a change will result in changes to the relational schema.

A relational optimization module 336 optimizes the relational schema to present a more concise schema to the user 130. For example, the relational optimization module 336 may identify one-to-one relationships between tables and flatten those tables into a single table, as described above. The resulting relational schema is provided to a metadata service 340.

A query executor 344 interfaces with the metadata service 340 to execute queries from a proxy 348. The proxy 348 interacts with an SQL-compliant client, such as an ODBC client 352, which is, without special configuration, able to interact with the proxy 348. The user 130 uses the ODBC client 352 to send queries to the query executor 344 and to receive responses to those queries.

Via the ODBC client 352, the user 130 can also see the relational schema stored by the metadata service 340 and construct queries over the relational schema. Neither the user 130 or the administrator 308 are required to know the expected schema or help create the schema. Instead, the schema is created dynamically based on the retrieved data and then presented. Although the ODBC client 352 is shown, mechanisms other than ODBC are available including JDBC, and direct postgres queries. In various implementations, a graphical user interface application may facilitate ease of use of the ODBC client 352 by the user.

The query executor 344 operates on data from a storage service 356, which includes the index storage 324. The storage service 356 may include its own local storage processing module 360, to which the query executor 344 can delegate various processing tasks. The processed data is then provided by the storage processing module 360 to the query executor 344 to construct a response to a received query. In a cloud-based implementation, the storage service 356 and the query executor 344 may both be implemented in a compute cloud, and the index storage 324 can be stored in the compute instances. The index storage 324 may be mirrored to nearline storage, such as in the storage cloud 116 as shown in FIG. 1A.

Figure 2B:
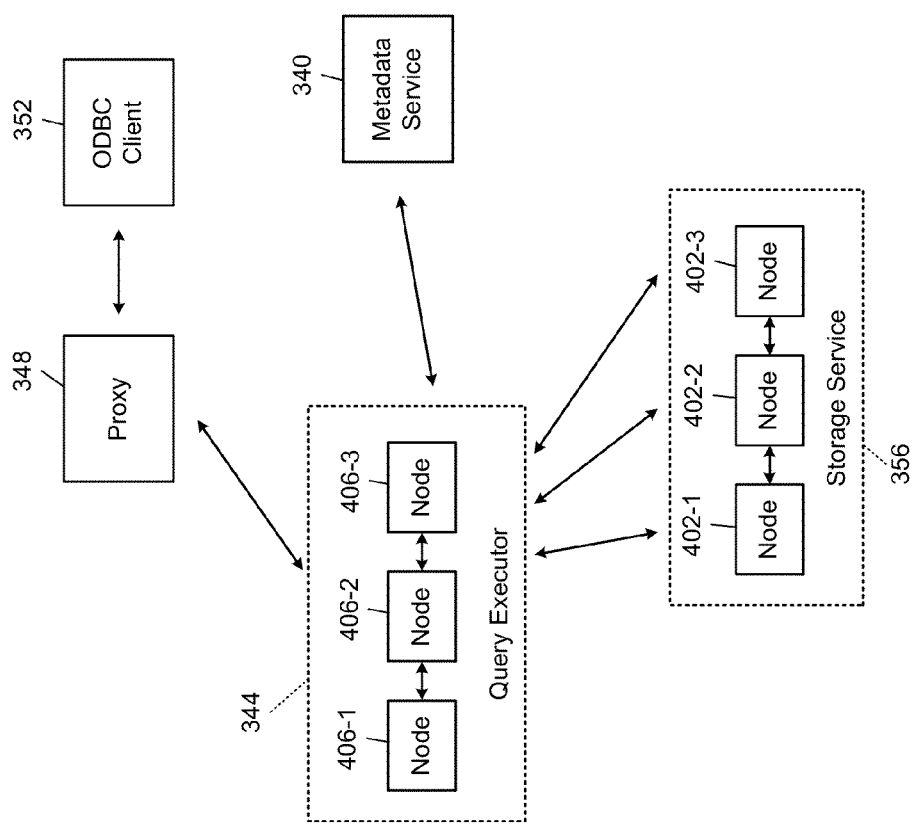
FIG. 2B is a functional block diagram of an example query system of a scalable analysis platform for semi-structured data.

In FIG. 2B, a high level functional diagram shows a storage service 356 with multiple nodes 402-1, 402-2, and 402-3 (collectively nodes 402). Although three nodes 402 are shown, more or fewer may be used, and the number used may be varied dynamically based on the needs of the analysis framework. The number of nodes 402 may be increased as more data needs to be stored as well as in response to additional processing being required to execute queries and/or to provide redundancy. The query executor 344 is shown with nodes 406-1, 406-2, and 406-3 (collectively nodes 406). The number of nodes 406 can also be varied dynamically based on query load, and is independent of the number of nodes 402.

A proxy 348 provides the interface between the ODBC client 352 and the query executor 344. The query executor 344 interacts with metadata service 340, which stores schemas for the data residing in the storage service 356.

Figure 3:
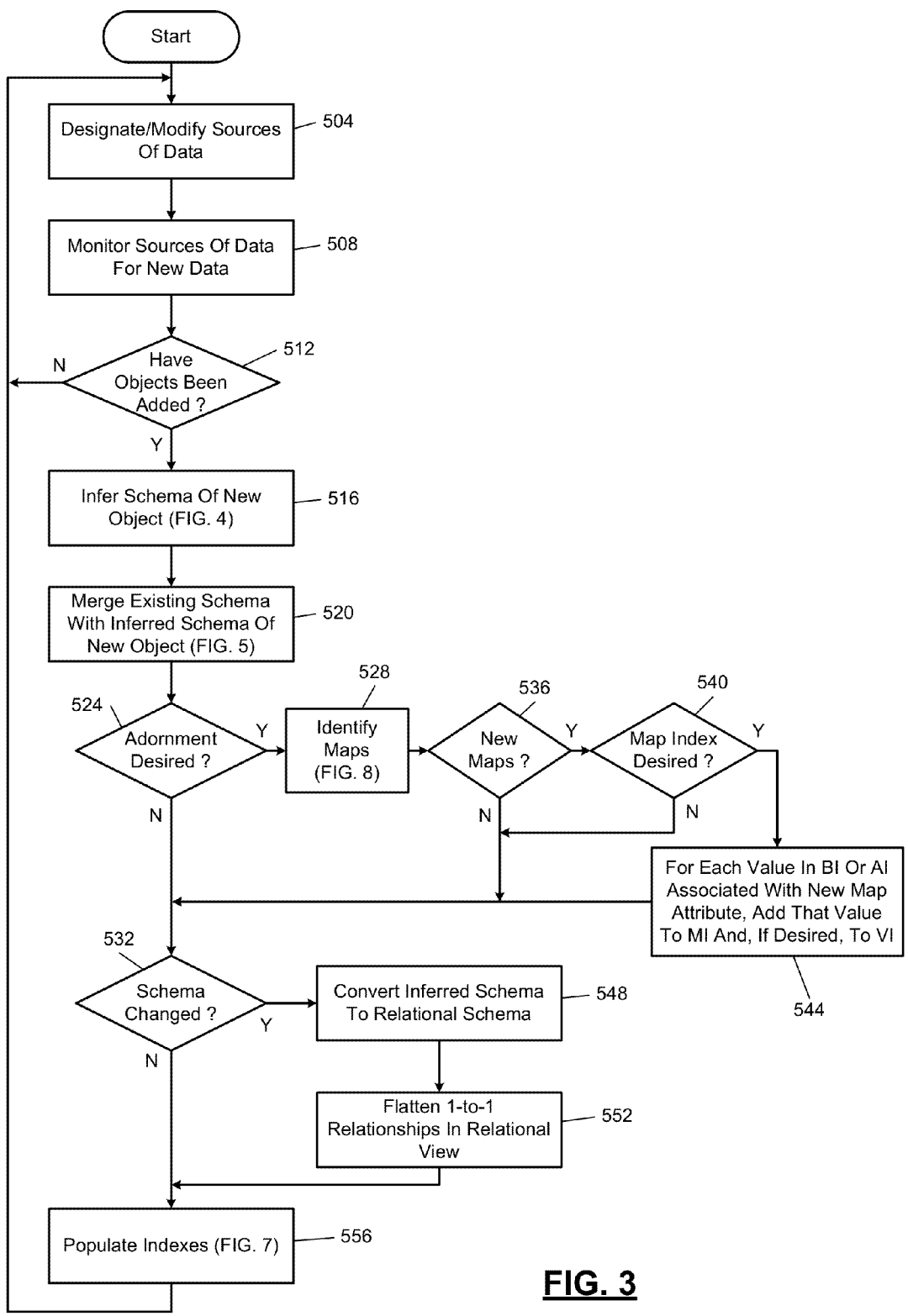
FIG. 3 is a flowchart depicting an example method of incorporating ingested data.

FIG. 3 shows an example process for data ingestion. Control begins at 504, where sources of data can be designated, such as by the user or administrator. In addition, certain data sets from the sources of data may be selected and certain subsetting and reducing operations may be requested of the data sources. Control continues at 508, where the designated data sources are monitored for new data.

Figure 4:
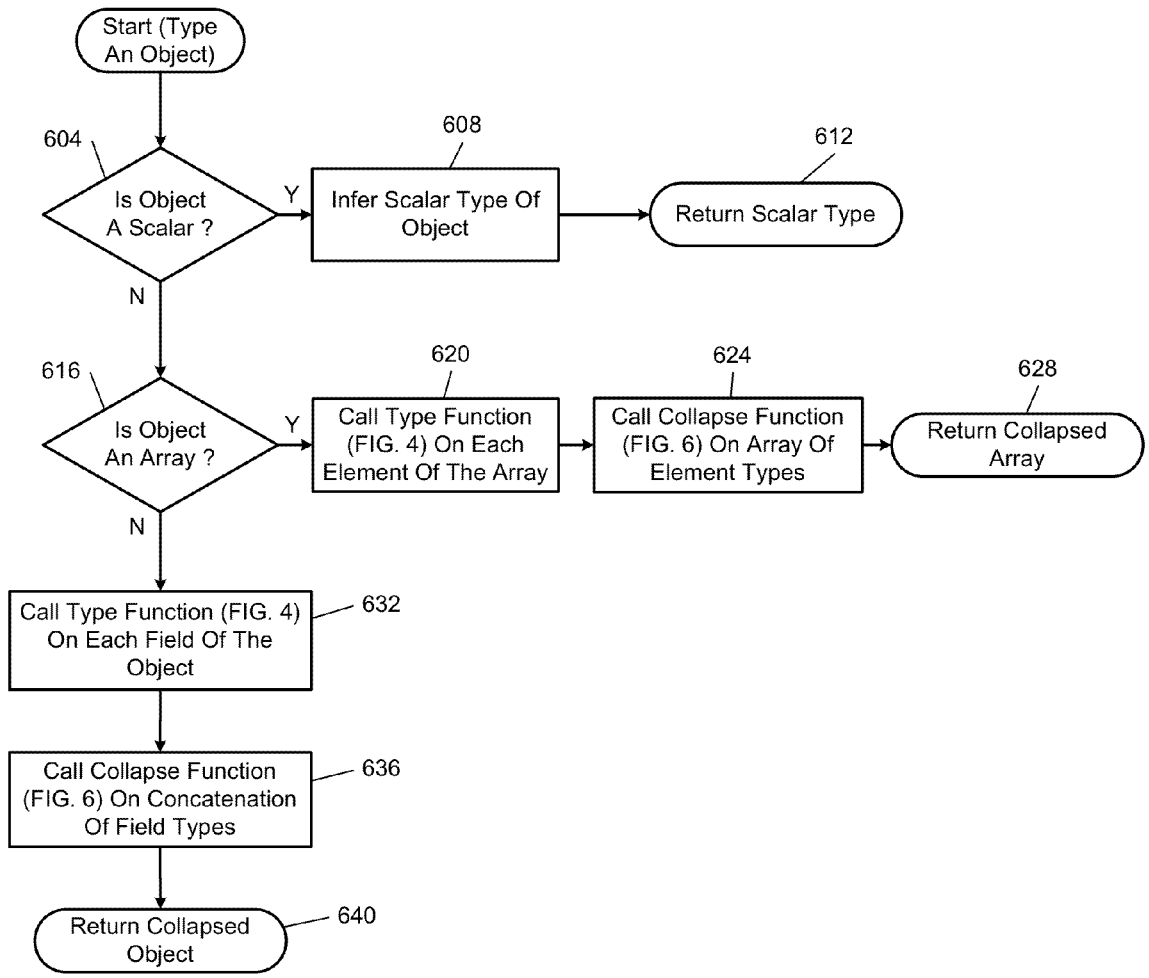
FIG. 4 is a flowchart depicting an example method of inferring a schema.
Figure 5:
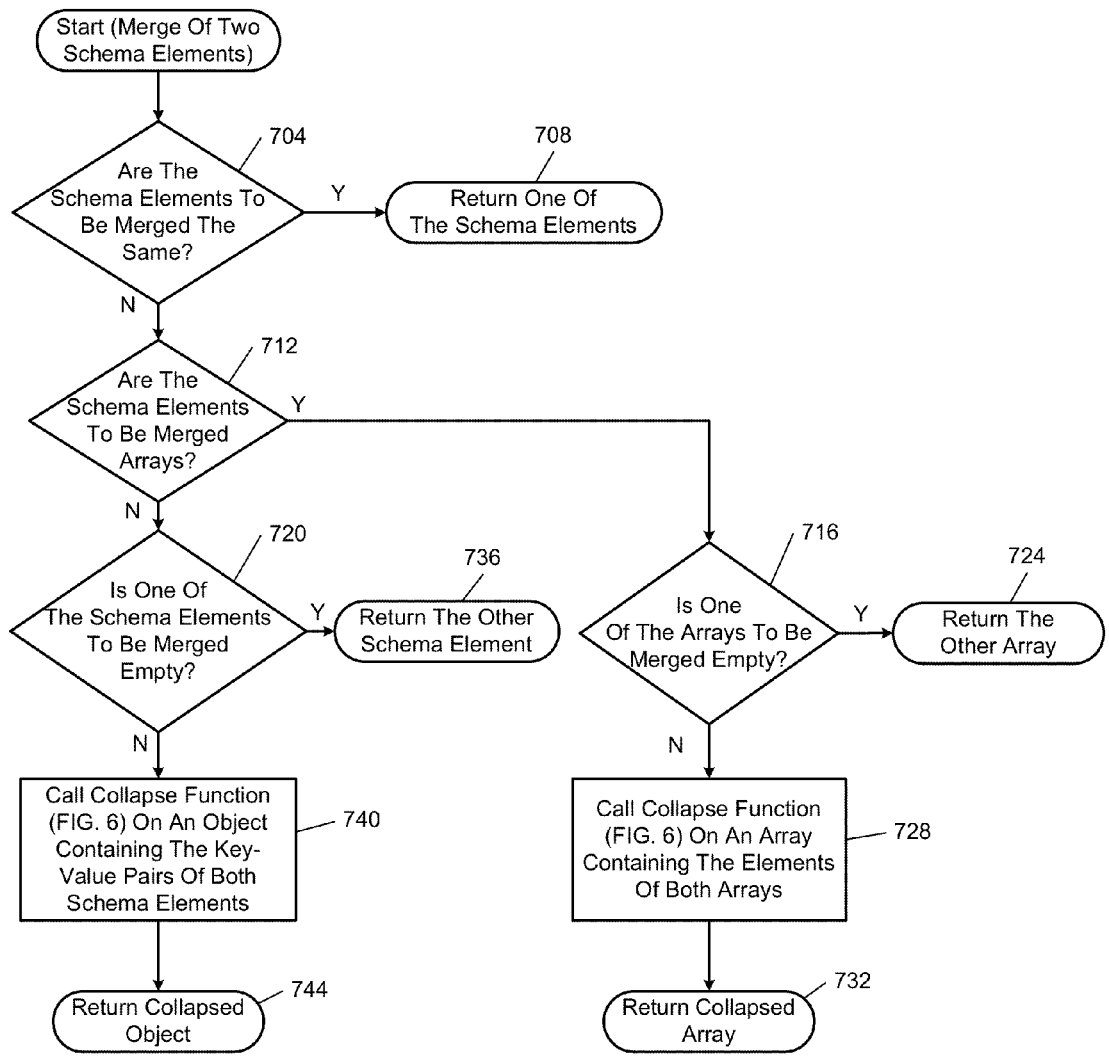
FIG. 5 is a flowchart depicting an example method of merging two schemas.

At 512, if new data objects have been added to the data sources, control transfers to 516; otherwise, control returns to 504, to allow the sources of data to be modified if desired. At 516, the schema of a new object is inferred, which may be performed according to a type function such as is shown in FIG. 4. At 520, the inferred schema from 516 is merged with the already-existing schema. The merge may be performed according to a merge function such as is shown in FIG. 5.

Figure 8:
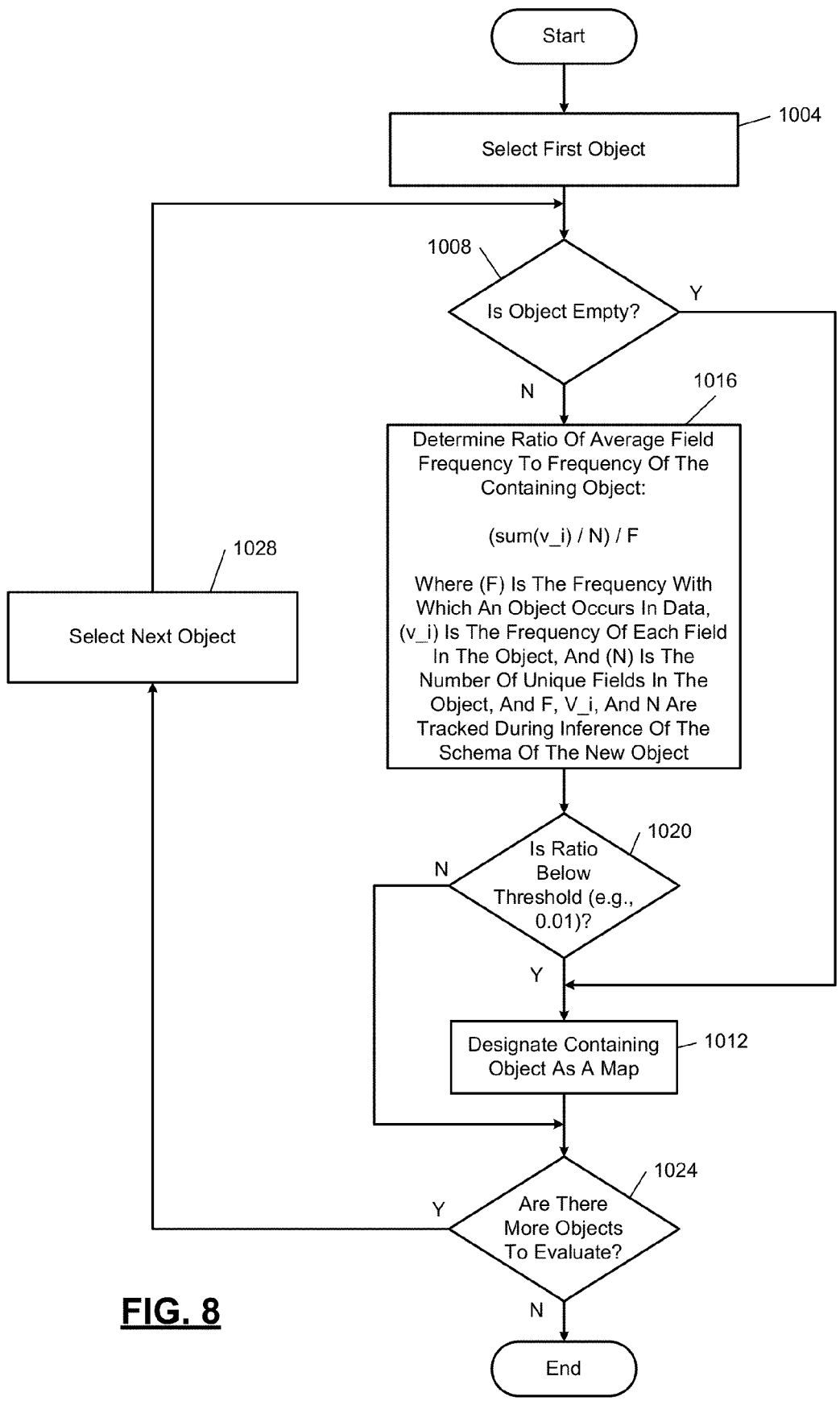
FIG. 8 is a flowchart depicting an example method of performing map adornment.

At 524, if adornment is desired, control transfers to 528; otherwise, control transfers to 532. At 528, maps are identified within the data, such as is shown in FIG. 8. At 536, if no new maps are identified, control continues at 532; otherwise, if new maps have been identified, control transfers to 540. At 540, if a map index is desired, control transfers to 544; otherwise, control continues at 532. At 544, for each value in the BigIndex or ArrayIndex associated with the new map attribute, that value is added to the map index. Further, if desired by the user and/or administrator, for the particular attribute, the values are added to the value index. Control then continues at 532.

In various implementations, adornment at 524 may wait until a first round of objects is processed. For example, on an initial ingest, adornment may be delayed until all of the initial objects are ingested. In this way, sufficient statistics will have been collected for use by the map heuristics. For incremental ingests of additional objects, adornment may be performed after each new group of additional objects.

Figure 7:
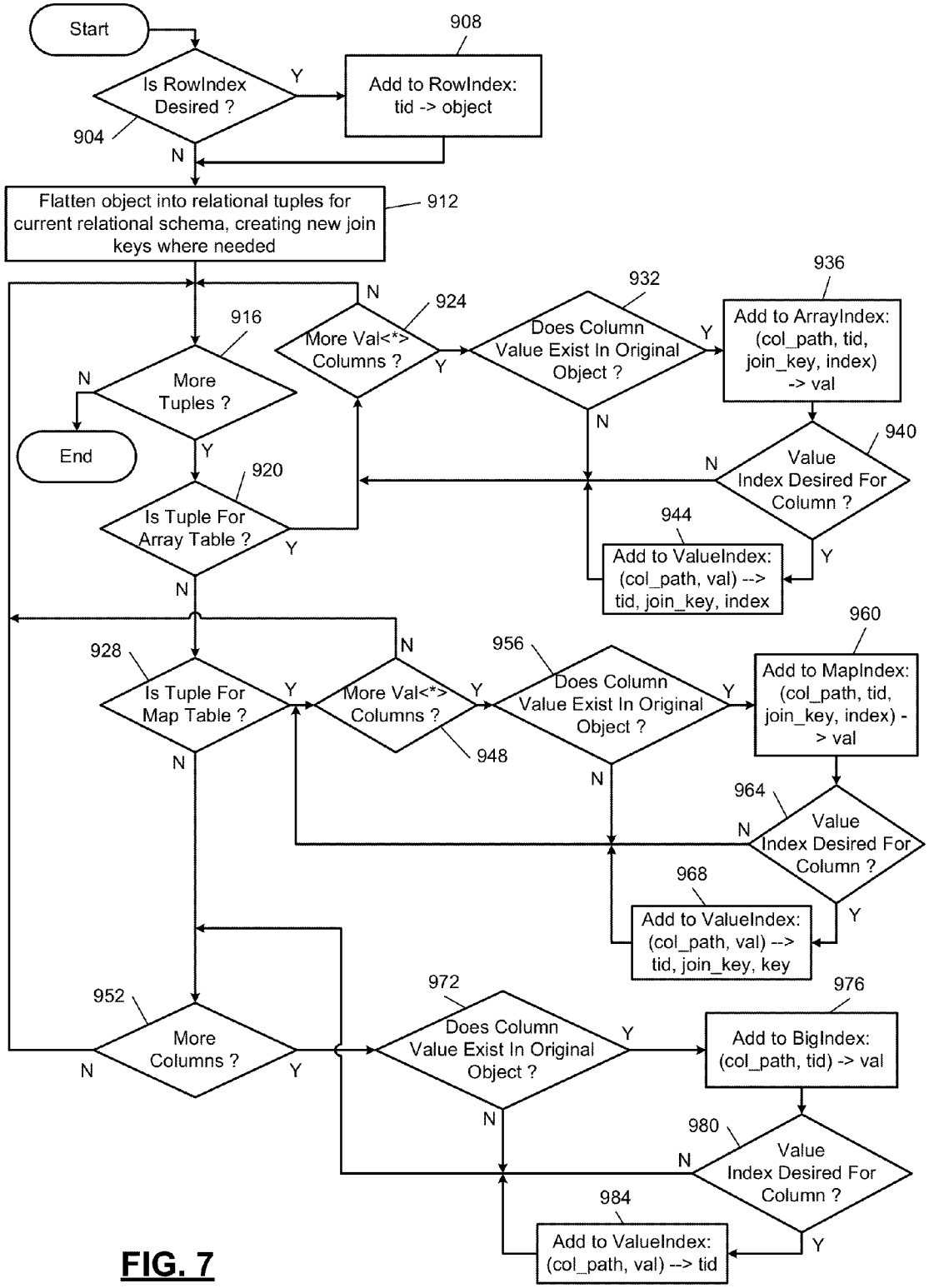
FIG. 7 is a flowchart depicting an example method of populating indexes with data.

At 532, if the JSON schema has changed as a result of the new objects, control transfers to 548 where the schema is converted to a relational schema. Control continues at 552 where the relational view is optimized, such as by flattening one-to-one relationships. Control then continues at 556. If the schema had not changed at 532, control would directly transfer to 556. At 556, indexes are populated with the data of the new object, which may be performed as shown in FIG. 7. Control then returns to 504.

Although population of the indexes is shown at 556 as being performed after converting the inferred schema to relational schema at 548, in various implementations, the indexes may be populated prior to generating the relational schema, as the relational schema is not required. The procedure can use the inferred JSON schema to generate paths and join keys. The relational schema serves as a relational view of the underlying semi-structured data.

FIG. 4 shows an example implementation of a type function relying on recursion. Control begins at 604 where, if the object to be typed is a scalar, control transfers to 608. At 608, the type of the scalar is determined and that scalar type is returned as an output of the function at 612. The scalar type may be determined based on self-description in the received object. In addition, further typing rules may be used, which may recognize that certain strings are representative of data such as dates or times.

Figure 6:
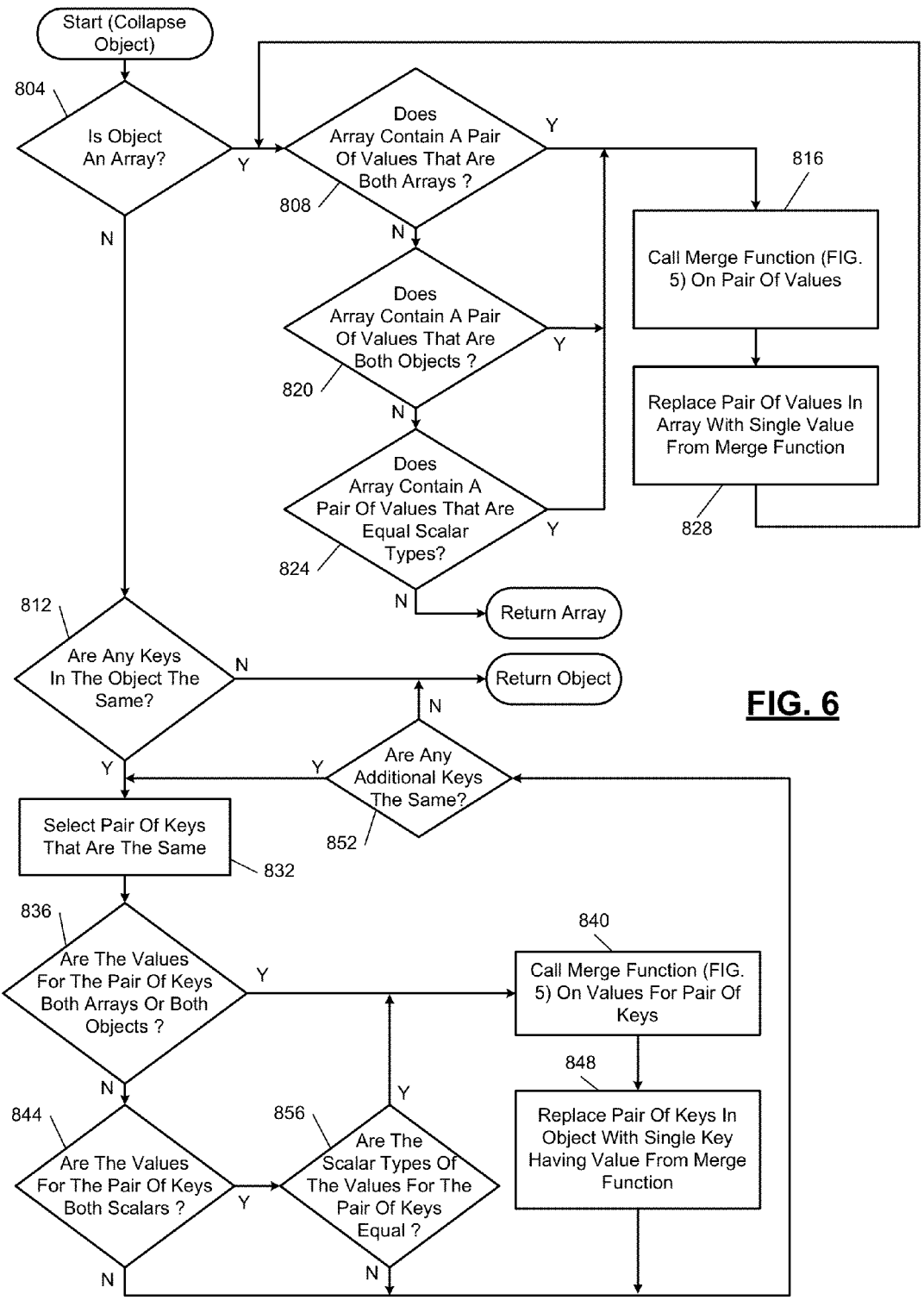
FIG. 6 is a flowchart depicting an example method of collapsing schemas.

If, at 604, the object is not a scalar, control transfers to 616. At 616, if the object is an array, control transfers to 620 where the type function (FIG. 4) is recursively called on each element of the array. When the results of these type functions have been received, control continues at 624 where a collapse function, such as is shown in FIG. 6, is called on an array of the element types as determined at 620. When the collapsed array is returned by the collapse function, that collapsed array is returned by the type function at 628.

If, at 616, the object is not an array, control transfers to 632. At 632, the type function (FIG. 4) is called recursively on each field of the object. Control continues at 636, where the collapse function, is called on a concatenation of the field types determined at 632. The collapsed object returned by the collapse function is then returned by the type function at 640.

FIG. 5 shows an example implementation of a merge function that merges two schema elements into a single schema element is shown. The merge function is also recursive and when first called, the two schema elements are a previously existing schema and a new schema inferred from a newly received object. In further recursive calls of the merge function, the schema elements will be sub-elements of these schemas. Control begins at 704 where, if the schema elements to be merged are equivalent, control transfers to 708 and returns either one of the equivalent schema elements. Otherwise, control transfers to 712 where, if the schema elements to be merged are both arrays, control transfers to 716; otherwise, control transfers to 720.

At 716, if one of the arrays to be merged is empty, the other array is returned at 724. Otherwise, control continues at 728, where a collapse function, such as is shown in FIG. 6, is called on an array containing the elements of both arrays to be merged. The collapsed array returned by the collapse function is then returned by the merge function at 732.

At 720, if one of the schema elements to be merged is empty, then the other schema element is returned by the merge function at 736. If neither of the schema elements to be merged is empty, control continues at 740 where the collapse function is called on an object containing the key-value pairs of both schema elements to be merged. The collapsed object returned by the collapse function is then returned by the merge function at 744.

FIG. 6 shows an example implementation of a collapse function. Control begins at 804 where, if the object to be collapsed is an array, control transfers to 808; otherwise, control transfers to 812. At 808, if the array contains a pair of values that are both arrays, control transfers to 816; otherwise, control continues at 820. At 820, if the array contains a pair of values that are both objects, control transfers to 816; otherwise, control continues at 824. At 824, if the array contains a pair of values that are equal scalar types, control transfers to 816; otherwise, the collapse is complete and the array is returned from the collapse function. At 816, a merge function, such as is shown in FIG. 5, is called on the pair of values identified by 808, 820, or 824. Control continues at 828, where the pair of values is replaced with a single value returned by the merge function.

At 812, if any of the keys in the object are the same, control transfers to 832; otherwise, collapse is complete and the object is returned. At 832, control selects a pair of keys that are the same and continues in 836. If the values for the pair of keys are both arrays or are both objects, control transfers to 840; otherwise, control transfers to 844. At 840, the merge function is called on the values for the pair of keys. Control continues at 848, where the pair of keys is replaced with a single key having a value returned by the merge function. Control then continues at 852 where, if any additional keys are the same, control transfers to 832; otherwise, the collapse is done and the object as modified is returned. At 844, if the values for the pair of keys are both scalars, control transfers to 856; otherwise, control transfers to 852. At 856, if the scalar types of the values for the pair of keys are equal, control transfers to 840 to merge those pair of keys; otherwise, control transfers to 852.

FIG. 7 shows an example process for populating indexes with data from newly retrieved objects. Control begins at 904 where, if the RowIndex is desired, control transfers to 908; otherwise, control transfers to 912. At 908, the object is added to the RowIndex as described above, and control continues at 912. At 912, the object is flattened into relational tuples for the current relation schema and join keys are created as needed. Control continues at 916 where control determines whether more tuples to be added to the indexes are present. If so, control transfers to 920; otherwise, the indexes have been populated and so control ends.

At 920, control determines whether the tuple is for an array table. If so, control transfers to 924; otherwise, control transfers 928. At 924, if there are more value columns in the array table, control transfers to 932. At 932, if the column value exists in the original retrieved object, the value is added to the ArrayIndex at 936. Control then continues at 940. If the ValueIndex is desired for the column, control transfers to 944; otherwise, control returns 924. If the column value does not exist in the original retrieved object at 932, control returns to 924.

At 928, if the tuple is for a map table, control transfers to 948; otherwise, control transfers to 952. At 948, control determines whether more value columns are remaining in the map table. If so, control transfers to 956; otherwise, control returns to 916. At 956, control determines whether the column value exists in the original retrieved object. If so, control transfers to 960; otherwise, control returns to 948. At 960, the value is added to the MapIndex and control transfers to 964. At 964, if the ValueIndex is desired for the column, the value is added to the ValueIndex in 968; in either case, control then returns to 948.

In 952, control determines whether there are more columns present in a table. If so, control transfers to 972; otherwise, control returns to 916. At 972, control determines whether column values exist in the original retrieved object. If so, control transfers to 976; otherwise, control returns to 952. At 976, the value is added to the BigIndex and control continues at 980. At 980, if the ValueIndex is desired for the column, control transfers to 984, where the value is added to the ValueIndex; in either case, control then returns to 952.

FIG. 8 shows an example process for identifying maps. Control begins at 1004 where a first object is selected. Control continues at 1008 where, if the object is empty, the containing object is designated as a map at 1012; otherwise, control transfers to 1016. At 1016, control determines the ratio of the average field frequency to the frequency of the containing object as described above. Control continues at 1020 where, if the ratio is below a threshold, control transfers to 1012 to designate the containing object as a map; otherwise, control transfers to 1024. For example only, the threshold may be user adjustable and/or may be dynamic based on observed data. In various implementations, the heuristic may be adjusted to more readily identify fields as maps as the relational schema grows larger. At 1012, the containing object is designated as a map and control continues at 1024. If there are more objects to evaluate, control transfers to 1028, where the next object is selected and control continues at 1008; otherwise, control ends.

Figure 9:
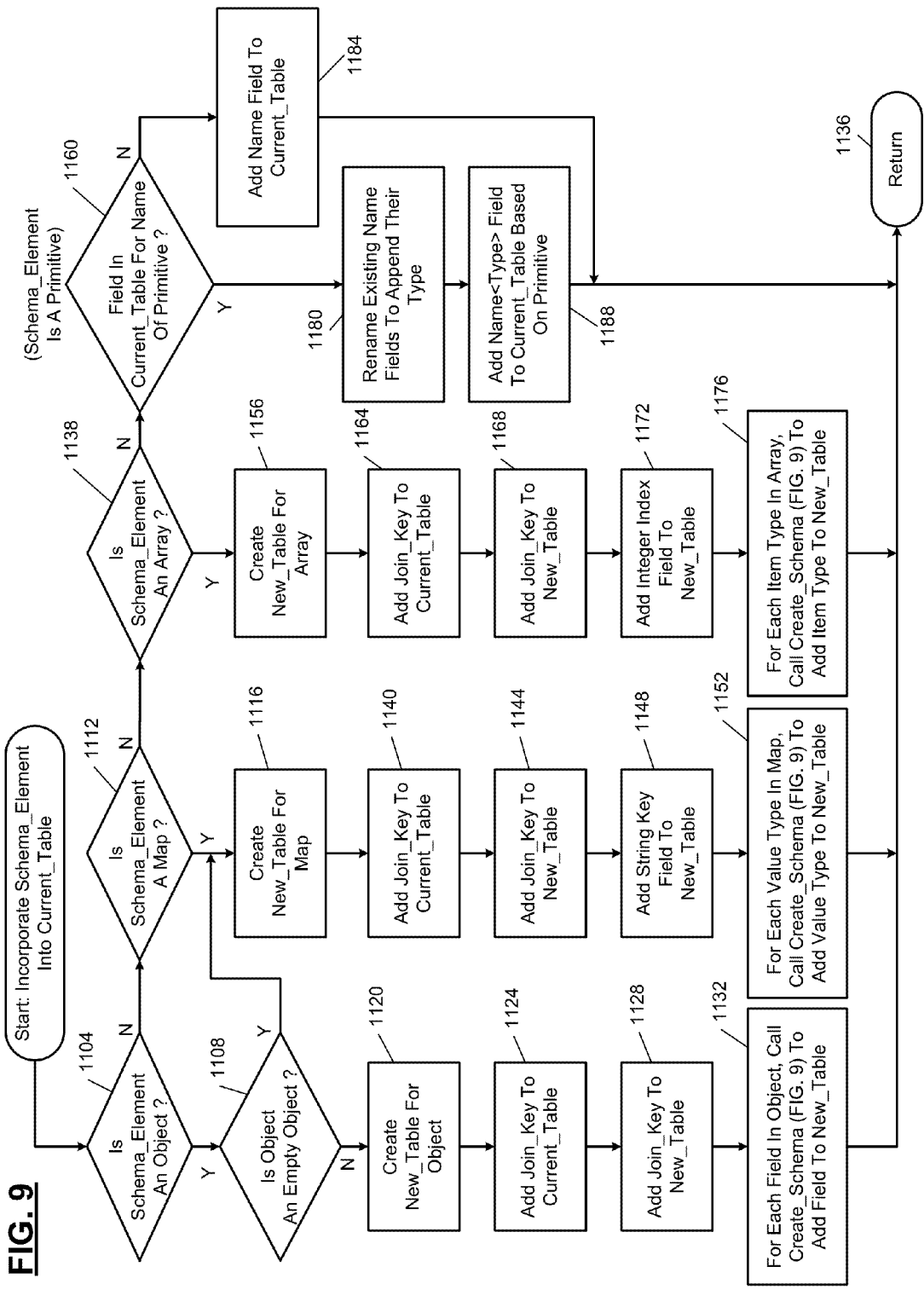
FIG. 9 is a flowchart depicting an example method of creating a relational schema from a JSON schema.

FIG. 9 shows an example implementation of a create_schema function relying on recursion to create a relational schema. When the create_schema function is called, control incorporates a schema element (Schema_Element) into a table (Current_Table). To this end, control begins at 1104 where, if Schema_Element is an object, control transfers to 1108; otherwise, control transfers to 1112. At 1108, if the object is an empty object, the object is treated as a map and control transfers to 1116; otherwise, control continues at 1120. At 1120, a new table (New_Table) is created for the nested object. At 1124, a join key (Join_Key) is added to Current_Table and at 1128 a corresponding Join_Key is added to New_Table. Control then continues at 1132 where, for each field in the nested object, the create_schema function is recursively called to add a field to the table. Control then returns from the present invocation of the create_schema function at 1136.

At 1112, if Schema_Element is a map, control transfers to 1116; otherwise, control transfers to 1138. At 1116, a new table (New_Table) is created for the map. Control continues at 1140, where a Join_Key is added to Current_Table and at 1144, a corresponding Join_Key is added to New_Table. At 1148, a key field having a string type is added to New_Table. Control continues at 1152 where, for each value type in the map, the create_schema function is recursively called to add the value type to New_Table. Control then returns at 1136.

At 1138, control determines whether Schema_Element is an array. If so, control transfers to 1156; otherwise, control transfers to 1160. At 1156, a new table (New_Table) is created for the array, a Join_Key is added to Current_Table at 1164, and a corresponding Join_Key is added to New_Table at 1168. At 1172, an index field having an integer type is added to New_Table. Control continues at 1176 where, for each item type in the array, the create_schema function is called to add the item type to New_Table. Control then returns at 1136.

At 1160, Schema_Element, by process of elimination, is a primitive. If there is already a field in Current_Table having the same name as the primitive, control transfers to 1180; otherwise, control transfers to 1184. At 1184, the name field is simply added to Current_Table and control returns at 1136. At 1180, type polymorphism is present and therefore existing fields in Current_Table having the same name as the primitive are renamed to append their type to the field name. Control continues at 1188 where a new field is added based on the current primitive, with the type appended to the field name. Control then returns at 1136.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

The invention claimed is:

1. A method of operating a query system, the method comprising:
   retrieving objects from a data source, wherein each of the retrieved objects includes (i) data and (ii) metadata describing the data;
   dynamically creating a cumulative schema by, for each object of the retrieved objects:
   (i) inferring a schema from the object based on the metadata of the object and inferred data types of elements of the data of the object,
   (ii) creating a unified schema wherein the unified schema describes both (a) the object described by the inferred schema and (b) a cumulative set of objects described by the cumulative schema, and
   (iii) storing the unified schema as the cumulative schema;
   storing the data of each of the retrieved objects in a storage service;
   receiving, from a user, a query; and
   responding to the query based on the data stored by the storage service.

2. The method of claim 1, further comprising:
   converting the cumulative schema into a relational schema; and
   presenting the relational schema to the user, wherein the query from the user is constructed over the relational schema.

3. The method of claim 2, further comprising:
   storing the data of a first object of the retrieved objects in at least one of (i) a first index and (ii) an array index, wherein the storage service includes the first index and the array index; and
   responding to the query based on data from at least one of the first index and the array index.

4. The method of claim 3, further comprising storing a datum from the first object in the first index as a key-value pair, wherein the value of the key-value pair is the datum, and wherein the key of the key-value pair is based on (i) a path of the datum consistent with the relational schema and (ii) a unique identifier of the first object.

5. The method of claim 4, wherein the key of the key-value pair is constructed so that the first index collocates key-value pairs first by the path and then by the unique identifier.

6. The method of claim 3, wherein a datum that is part of an array is stored in the array index.

7. The method of claim 6, wherein data that is part of an array is not stored in the first index.

8. The method of claim 6, wherein the datum is stored in the array index as a key-value pair, wherein the value of the key-value pair is the datum, and wherein the key of the key-value pair is based on (i) a path of the datum consistent with the relational schema, (ii) a unique identifier of the first object, and (iii) an index of the datum's location in the array.

9. The method of claim 8, wherein the key of the key-value pair is constructed so that the array index collocates key-value pairs first by the path, next by the unique identifier, and then by the index.

10. The method of claim 8, wherein the key of the key-value pair is further based on a join key.

11. The method of claim 10, wherein the key of the key-value pair is constructed so that the array index collocates key-value pairs first by the path, next by the unique identifier, next by the join key, and then by the index.

12. The method of claim 6, further comprising selectively storing the datum in an auxiliary array index.

13. The method of claim 12, wherein the datum is stored in the auxiliary array index as a key-value pair, wherein the value of the key-value pair is the datum, and wherein the key of the key-value pair is based on (i) a path of the datum consistent with the relational schema, (ii) an index of the datum's location in the array, and (iii) a unique identifier of the object.

14. The method of claim 13, wherein the key of the key-value pair is constructed so that the auxiliary array index collocates key-value pairs first by the path, next by the index, and then by the unique identifier.

15. The method of claim 13, wherein the key of the key-value pair is further based on a join key.

16. The method of claim 15, wherein the key of the key-value pair is constructed so that the auxiliary array index collocates key-value pairs first by the path, next by the index, next by the unique identifier, and then by the join key.

17. The method of claim 3, further comprising storing the first index in an order-preserving index store, wherein the storage service includes the order-preserving index store.

18. The method of claim 17, further comprising storing the array index in the order-preserving index store.

19. The method of claim 2, wherein the relational schema is a structured query language (SQL) schema, and the query is an SQL query.

20. The method of claim 2, wherein the query is one of a Hive-QL query, a jaql query, and XQuery.

21. The method of claim 2, further comprising selectively identifying an object of the cumulative schema as a map.

22. The method of claim 21, wherein the object of the cumulative schema is identified as a map based on frequencies of occurrence of fields of the object within the retrieved objects.

23. The method of claim 22, further comprising tracking the occurrence frequencies while dynamically creating the cumulative schema.

24. The method of claim 22, wherein the object of the cumulative schema is identified as a map in response to an average of the frequencies of occurrence being below a threshold.

25. The method of claim 21, further comprising storing a datum corresponding to the map into a map index as a key-value pair, wherein the value of the key-value pair is the datum, and wherein the key of the key-value pair is based on (i) a path of the datum consistent with the relational schema, (ii) a unique identifier of a first object of the retrieved objects, wherein the first object provided the datum, (iii) a join key of the map, and (iv) a map key of the datum in the map.

26. The method of claim 25, wherein the key of the key-value pair is constructed so that the map index collocates key-value pairs first by the path, next by the unique identifier, next by the join key, and then by the map key.

27. The method of claim 21, further comprising storing a datum corresponding to the map into an auxiliary map index as a key-value pair, wherein the value of the key-value pair is the datum, and wherein the key of the key-value pair is based on (i) a path of the datum consistent with the relational schema, (ii) a map key of the datum in the map, (iii) a unique identifier of a first object of the retrieved objects, wherein the first object provided the datum, and (iv) a join key of the map.

28. The method of claim 27, wherein the key of the key-value pair is constructed so that the auxiliary map index collocates key-value pairs first by the path, next by the map key, next by the unique identifier, and then by the join key.

29. The method of claim 21, wherein converting the cumulative schema into the relational schema further includes creating an additional table in the relational schema for each map determined to be present in the cumulative schema.

30. The method of claim 29, wherein the additional table includes (i) a join key column, (ii) a key column, and (iii) for each scalar type of data in the map, a value column.

31. The method of claim 30, wherein the key column is a string type.

32. The method of claim 29, further comprising, when the map is present at the top level of the cumulative schema, inserting a join key column into the additional table and inserting a join key column into the root table.

33. The method of claim 32, further comprising, when the map is nested in the cumulative schema below the top level, inserting the join key column into the additional table and inserting a join key column into an intermediate table.

34. The method of claim 2, wherein converting the cumulative schema into the relational schema includes creating a root table with a column for each element in a top level of the cumulative schema.

35. The method of claim 34, wherein converting the cumulative schema into the relational schema further includes creating an additional table in the relational schema for each array in the cumulative schema.

36. The method of claim 35, wherein the additional table includes (i) a join key column, (ii) an index column, and (iii) for each scalar type of data in the array, a value column.

37. The method of claim 35, further comprising, when the array is present at the top level of the cumulative schema, inserting a join key column into the additional table and inserting a join key column into the root table.

38. The method of claim 37, further comprising, when the array is nested in the cumulative schema below the top level, inserting the join key column into the additional table and inserting a join key column into an intermediate table.

39. The method of claim 2, further comprising selectively storing a data value of a first object of the retrieved objects in a value index as a key-value pair, wherein the key of the key-value pair is based on (i) a path of the data value consistent with the relational schema and (ii) the data value, wherein the value of the key-value pair is based on a unique identifier of the first object, and wherein the storage service includes the value index.

40. The method of claim 39, wherein the key of the key-value pair is constructed so that the value index collocates key-value pairs first by the path, and then by the data value.

41. The method of claim 39, wherein when the data value is part of an array, the value of the key-value pair is further based on an index of the data value in the array.

42. The method of claim 41, wherein the value of the key-value pair is further based on a join key of the array.

43. The method of claim 39, wherein when the data value is part of a map, the value of the key-value pair is further based on a map key of the data value in the map.

44. The method of claim 43, wherein the value of the key-value pair is further based on a join key of the map.

45. The method of claim 1, further comprising generating the retrieved objects by adding metadata to raw data obtained from the data source.

46. The method of claim 1, wherein, for each object of the retrieved objects, the data of the object includes values and the metadata of the object includes names of the values.

47. The method of claim 1, wherein each object of the retrieved objects is a JavaScript Object Notation (JSON) object.

48. The method of claim 1, wherein the cumulative schema is a JavaScript Object Notation (JSON) schema.

49. The method of claim 1, further comprising selectively storing each object of the retrieved objects in a row index, wherein the storage service includes the row index.

50. The method of claim 49, wherein a first object of the retrieved objects is stored in the row index as a key-value pair, wherein the key of the key-value pair is a unique identifier of the first object, and wherein the value of the key-value pair is a serialization of an entirety of the first object.

* * * * *